(12) United States Patent
Phillipi et al.

(10) Patent No.: US 7,305,464 B2
(45) Date of Patent: Dec. 4, 2007

(54) SYSTEMS AND METHODS FOR BROADBAND NETWORK OPTIMIZATION

(75) Inventors: Mark P. Phillipi, Fort Mill, SC (US); Bradley S. Ross, Huntersville, NC (US); Todd J. Anderson, Charlotte, NC (US)

(73) Assignee: End II End Communications, Inc., Charlotte, NC (US)

( * ) Notice: Subject to any disclaimer, the term of this patent is extended or adjusted under 35 U.S.C. 154(b) by 634 days.

(21) Appl. No.: 10/651,436

(22) Filed: Aug. 29, 2003

(65) Prior Publication Data

US 2004/0044761 A1  Mar. 4, 2004

Related U.S. Application Data

(60) Provisional application No. 60/407,855, filed on Sep. 3, 2002.

(51) Int. Cl.
*G06F 15/173* (2006.01)
*G06F 15/16* (2006.01)

(52) U.S. Cl. ................. 709/223; 709/226; 709/232

(58) Field of Classification Search ........... 709/223, 709/226, 232
See application file for complete search history.

(56) References Cited

U.S. PATENT DOCUMENTS

| | | | |
|---|---|---|---|
| 5,212,807 A * | 5/1993 | Chan ................ 455/525 |
| 5,583,995 A | 12/1996 | Gardner |
| 5,751,970 A | 5/1998 | Bournas |
| 5,764,740 A | 6/1998 | Holender |
| 5,787,071 A | 7/1998 | Basso |
| 5,802,307 A | 9/1998 | Melo |
| 5,809,282 A | 9/1998 | Cooper et al. |
| 5,872,918 A | 2/1999 | Malomsoky |
| 5,892,753 A | 4/1999 | Badt et al. |
| 5,899,955 A * | 5/1999 | Yagyu et al. ............ 701/209 |
| 5,943,317 A | 8/1999 | Brabson et al. |
| 5,956,341 A | 9/1999 | Galand et al. |
| 5,959,974 A | 9/1999 | Badt et al. |
| 6,002,670 A | 12/1999 | Rahman |
| 6,011,775 A | 1/2000 | Bonomi et al. |
| 6,011,804 A | 1/2000 | Bertin |
| 6,044,475 A | 3/2000 | LeBoudec |

(Continued)

OTHER PUBLICATIONS

TechTarget, "Traceroute a Whatis.com Definition", Aug. 30, 2002, http://searchnetworking.techtarget.com/gDefinition/0,294236,sid7_gci213209,00.html.*

(Continued)

*Primary Examiner*—Jason Cardone
*Assistant Examiner*—Brian J Gillis
(74) *Attorney, Agent, or Firm*—James J. Bindseil

(57) ABSTRACT

Disclosed are systems and methods for maximizing transmission throughput or capacity in a heterogeneous communications network. The systems and methods may include any one, or combinations, of: a route tracing module for identifying an optimization endpoint or destination; a testing module for sending representative test data to the endpoint/destination and measuring the data throughput/capacity for a given set of transmission variable values; and an optimization module for analyzing the set of transmission variable values and the associated data throughput/capacity, and determining an optimized set of transmission variables/values. Thus, the optimization module changes the transmission variable values of an associated network device operating within the heterogeneous communications network to achieve maximum data throughput/capacity.

64 Claims, 12 Drawing Sheets

U.S. PATENT DOCUMENTS

| | | | |
|---|---|---|---|
| 6,112,239 A | 8/2000 | Kenner et al. | |
| 6,201,791 B1 | 3/2001 | Bournas | |
| 6,205,473 B1 | 3/2001 | Thomasson et al. | |
| 6,262,976 B1 | 7/2001 | McNamara | |
| 6,266,701 B1 | 7/2001 | Sridhar et al. | |
| 6,285,658 B1 | 9/2001 | Packer | |
| 6,295,516 B1 | 9/2001 | Takeyasu | |
| 6,314,093 B1 | 11/2001 | Mann | |
| 6,320,845 B1 | 11/2001 | Davie | |
| 6,321,336 B1 | 11/2001 | Applegate et al. | |
| 6,349,090 B1 | 2/2002 | Lewis et al. | |
| 6,363,334 B1 | 3/2002 | Andrews et al. | |
| 6,381,641 B1 | 4/2002 | Iwasaki | |
| 6,400,686 B1 | 6/2002 | Ghanwani et al. | |
| 6,407,983 B1 | 6/2002 | Zheng et al. | |
| 6,411,946 B1 | 6/2002 | Chaudhuri | |
| 6,542,469 B1 * | 4/2003 | Kelley et al. | 370/238 |
| 6,557,055 B1 | 4/2003 | Wiese | |
| 6,578,087 B1 | 6/2003 | Garakani | |
| 6,625,650 B2 | 9/2003 | Stelliga | |
| 6,647,419 B1 | 11/2003 | Mogul | |
| 6,654,384 B1 * | 11/2003 | Reza et al. | 370/469 |
| 6,769,030 B1 | 7/2004 | Bournas | |
| 6,795,399 B1 | 9/2004 | Benmohamed | |
| 6,850,965 B2 | 2/2005 | Allen | |
| 6,874,032 B2 * | 3/2005 | Gersht et al. | 709/235 |
| 6,909,700 B1 * | 6/2005 | Benmohamed et al. | 370/255 |
| 6,925,504 B1 | 8/2005 | Liskov | |
| 6,973,504 B2 | 12/2005 | Nomura | |
| 6,987,729 B1 | 1/2006 | Gopalakrishnan | |
| 6,990,079 B2 | 1/2006 | Vrabel | |
| 7,010,590 B1 * | 3/2006 | Munshi | 709/224 |
| 7,028,024 B1 * | 4/2006 | Kommers et al. | 707/3 |
| 2002/0010792 A1 | 1/2002 | Border et al. | |
| 2002/0013840 A1 | 1/2002 | Border et al. | |
| 2002/0029274 A1 | 3/2002 | Allen | |
| 2002/0038373 A1 | 3/2002 | Border et al. | |
| 2002/0059435 A1 | 5/2002 | Border et al. | |
| 2002/0078164 A1 | 6/2002 | Reinschmidt | |
| 2002/0080726 A1 | 6/2002 | Klassen et al. | |
| 2002/0085559 A1 | 7/2002 | Gibson et al. | |
| 2002/0169880 A1 * | 11/2002 | Loguinov et al. | 709/228 |
| 2003/0026207 A1 * | 2/2003 | Loguinov | 370/235 |
| 2003/0072327 A1 | 4/2003 | Fodor | |
| 2003/0161338 A1 * | 8/2003 | Ng et al. | 370/437 |

OTHER PUBLICATIONS

Internet Engineering Task Force, Network Working Group, Request For Comments #1063, Jul., 1988.

Internet Engineering Task Force, Network Working Group, Request For Comments #1191, Nov., 1990.

Internet Engineering Task Force, Network Working Group, Request For Comments #1323, May, 1992.

Internet Engineering Task Force, Networking Working Group, Request For Comments #1483, Jul., 1993.

Internet Engineering Task Force, Network Working Group, Request For Comments #1825, Nov., 1998.

Internet Engineering Task Force, Network Working Group, Request For Comments #2488, Jan., 1999.

Internet Engineering Task Force, Network Working Group, Request For Comments #2760, Feb., 2000.

Internet Engineering Task Force, Network Working Group, Request For Comments #3135, Jun., 2001.

Internet Engineering Task Force, Network Working Group, Request For Comments #3234, Feb., 2002.

Internet Engineering Task Force, Network Working Group, Request For Comments #3272, May, 2002.

\* cited by examiner

SYSTEMS AND METHODS FOR BROADBAND NETWORK OPTIMIZATION

CROSS-REFERENCE TO RELATED APPLICATIONS

The present application claims priority to U.S. Application No. 60/407,855 filed Sep. 3, 2002, which is hereby incorporated by reference.

BACKGROUND

The present invention relates to communications networks, and in particular, to systems and methods for maximizing the throughput or capacity of broadband network communications.

There is an emerging trend for private and public enterprises to fundamentally change the structure of their Wide Area Networks (WANs). Historically, corporate WANs were constructed with dedicated circuits (aka private lines, leased lines) provided by the telecommunications carriers for the sole use of the corporate enterprise. That is to say, only the corporation's locations were connected by these private circuits and only the corporation's data traffic was transported across the private WAN. Privacy and security were ensured because the circuits were in no way shared with other users outside the corporation. With the proliferation of the Internet worldwide, corporations have begun to realize cost savings and utilize increased bandwidth by migrating from their existing homogeneous private WANs to using the public, heterogeneous network that is the Internet. Using the Internet creates the need to optimize each network connection to obtain maximum throughput and reliability. Private networks have traditionally been built by small number of carriers with interoperable (but often proprietary) standards and similar underlying technology that operates with simple, consistent communications parameters. A private network, once provisioned and operable, is static and requires little further maintenance or tuning. By definition the public Internet is a collection of many different carriers, all using different transport, routing and switching technologies, and a network topology that dynamically evolves over time. The transition to utilizing the public broadband Internet as the infrastructure for a corporate WAN has created the need to monitor, analyze, measure and control the parameters associated with each communications path in order to maintain and maximize network performance.

Referring to FIG. 1, current private circuit corporate networks 10 are mostly built in a traditional hub and spoke topology. Remote computer sites 12 are connected to a main corporate data center 14 through private Frame Relay connections 16, including remote and hub routers 18, 20. A typical corporate data center 14 may include one or more mainframe computers 22 and servers 24 connected to local computer sites 26, and the remote sites 12, through a local area network hub or switch 28. Access by the remote sites 12 to websites 30 on the Internet 32 is often provided by the same frame relay connection 12 to the data center hub 18, and then through a protective firewall device 34 and a router 36. All users at the remote sites 12 wishing to access to the Internet 32 must first traverse the Frame Relay network 16 to reach the single Internet connection at the data center 14. As Internet communications and Internet based applications and services expanded, the resulting traffic on the private Frame network 16 has dramatically increased. Since Frame Relay costs are based on bandwidth needed, this increase in Internet traffic has resulted in companies having to significantly increase the bandwidth of their Frame Relay connections 16 and incur the accompanying costs. Furthermore, the strain on network resources at the corporate data center 14 requires additional financial, human and network resources.

In a private Frame Relay network 16, the communications fabric and equipment is fairly consistent if not identical, and usually under the management of a single telecommunications carrier such as AT&T, Qwest, Sprint or Worldcom. In this topology, each packet of information leaving any remote WAN site or the corporate data center follows the same path using the same protocol and sees a fixed amount of bandwidth available on each leg of its journey from the source to the destination within the WAN. Since only the corporation's data traverses the network, simple traffic management allows each data transmission to use all the available bandwidth on each leg of the network. In this environment, optimizing and tuning of the communications network is simple and unchanging. Once operable, the customer is confident that the configuration at one site can be replicated across all sites to create a robust and reliable network. Since all transmission paths are explicitly defined, the WAN's performance is easily monitored and managed.

The relative simplicity of the homogenous legacy private WAN described above comes at great financial cost and is quite wasteful. Each private circuit costs a fixed amount regardless of the level of usage. Compromises must be struck between average and peak needs on the basis of cost and therefore bottlenecks and collisions invariably arise at times of peak corporate network activity while most of the bandwidth goes unused for the rest of the time.

As a result, corporations are turning to the public broadband, the Internet, as a cheaper, faster way to communicate both among the company's sites and between different companies. Referring to FIG. 2, one example of a public broadband corporate WAN 40 includes remote computer sites 12 connected to a corporate data center 14 directly through the Internet 32. Each remote site 12, depending on the exact type of computer equipment at the site and the type of connection (satellite, cable, phone, etc), may include a variety of network devices 42, such as switches, routers, firewalls, hubs, etc, to enable the connection through the Internet 32 to the corporate data center 14. Although the transition to public broadband corporate WANs has just begun, already many new broadband customers receive less than optimal or even acceptable levels of performance from these new, low cost, high bandwidth solutions. Much of the sub-optimal network performance is largely due to the lack of expertise and experience with networks as diverse and complex as the Internet. Furthermore, previous methods of optimization no longer work because of the unknown and intrinsic variation in the path a data packet takes over the Internet from its source to its destination. Network tuning techniques used on private networks simply fail on the Internet.

In order to use an Internet based WAN, a company creates an internal company extranet or intranet that let authorized users access custom Web pages, reports and forms through the Internet. This method is perhaps the easiest and most cost-effective way to create access; however, while it is possible to configure an extranet to permit direct access of files, they are generally used to serve information as a Web page.

While all of these methods have worked well, and in many cases still do, they suffer from a number of drawbacks including less than optimal speed, less than optimal security, high recurring costs and lengthy amounts of time to deploy.

Further, the dependence of companies on e-mail is growing at a rapid rate. The number and size of each e-mail message is also increasing, thus placing importance on the speed and reliability of the connection for the remote user.

In an effort to address some of these issues, a communication method called a Virtual Private Network (VPN) has been utilized. A VPN allows private connections between two machines using any shared or public Internet connection. Referring to FIG. 2, for example, a remote site 12 may include a VPN server 44 that connects through the Internet 32 to a corresponding VPN server 46 at the corporate data center 14. VPNs permit a company to extend connectivity to remote users with the same reliability and security of those attached locally. The need for leased point-to-point links is eliminated because the VPN can function from any Internet connection. The underlying technology behind a VPN has been around for several years, but the wide-scale availability of low-cost, dedicated broadband Internet access such as cable and DSL has companies, large and small, rethinking their remote access strategy.

VPNs are based on a concept called tunneling, a method of encapsulating data into encrypted packets that can travel over IP networks securely and be delivered to a specific address. VPNs are created using one of four possible protocols: Layer 2 Tunneling Protocol (L2TP), Layer 2 forwarding (L2F), Point-to-Point Tunneling Protocol (PPTP) and IP Security Protocol (IPSec). These protocols define methods to create a VPN over many connection types. The VPN was created prior to the availability of cable or DSL Internet access as a means to establish an on-demand private network between a network server and a dial-in remote user.

When dialing-in to any Internet point-of-presence (POP) using the basic 56 kb/s (or slower) modem, the connection is probably made using the Point-to-Point Protocol (PPP). L2TP, L2F and PPTP are VPN protocols that were created primarily to work inside of PPP. These protocols support several authentication methods used in PPP including the Password Authentication Protocol (PAP) and Challenge Handshake Authentication Protocol (CHAP). The L2F protocol adds a two-step authentication process, one from the user and one from the ISP, as well as the ability to create more than a single connection. L2TP enhances and improves upon the security shortcomings of PPTP and L2F through the use of stronger encryption and its support of a multitude of transport methods in addition to PPP. IPSec is currently the leading protocol used in corporate VPNs. The IPSec protocol was created exclusively for use over IP networks, to be used with the emerging IP standard called IPv6. IPSec also uses a host of features that ensure a high degree of security and data integrity.

In the Internet world, packets exchanged between two sites may travel across the Internet over very different paths, traverse numerous different communications protocols and can be processed by a variety of routing and/or switching technologies. While this level of "variety" keeps the cost of broadband Internet access down where the choice of technologies implemented anywhere on the Internet is optimal for the bandwidth and number of connections at a given location, the lack of uniformity vastly increases the complexity of the network topology. The interconnectedness of all the different backbone providers coupled with a multitude of competing/overlapping Internet Service Providers (ISPs) gives the Internet its tremendous dynamic capacity and flexibility, but also ensures that no one can predict the path his data traffic will take between two sites at any given moment. While the Internet Protocol (IP) provides a common standard by which every host communicates, each Internet provider selects different transport protocols and a variety of routing and switching technologies and manufacturers with which they deliver EP-based broadband Internet service. In contrast, in the private Frame Relay network of old, data always traversed the same path, across the same switches at the same locations every time; the network was both simple and predictable.

On the Internet, any time a user opens any Internet application (web browsing-http, email, file transfer-ftp, remote access-telnet, etc.) each data transmission between the source and the destination may be routed differently, because the local network environment at each junction (aka hop) is different at any point in time. Routing decisions are made based on variety of open standard protocols which route each packet based on the relationships defined amongst the local neighborhood of routers (ex. Open Shortest Path First—OSPF, Border Gateway Protocol—BGP, Routing Information Protocol—RIP, Interior Gateway Protocol—IGP, Exterior Gateway Protocol, EGP). If the data packet encounters a switch, then completely different algorithms and methods (ex. Data Layer Switching—DLS or Asynchronous Transfer Mode—ATM Switching) are applied to the processing of the packet.

How then does one define optimum performance for data transmission over the Internet? What is the capacity of the Internet, defined as the largest amount of data transferred in the shortest possible time between a given source and destination? Capacity may also be defined as the product of maximum bandwidth multiplied by the transit time. But, since each hop most likely has a different bandwidth based on the physical medium and transport protocol, which value would one choose? The ideal minimum transit time of a packet traveling from source to destination would be the physical distance traveling multiplied by the intrinsic speed of the transport medium (wire speed for electrons traveling down a copper wire, light speed for photons traveling down an optical fiber). If one assumed that switching and routing at a node happened instantaneously, then to a first approximation this transit time would be a reasonable estimate for a private switched local area network (LAN). Since the path is ill-defined for a routing-based packet-forwarding IP network, such as the Internet, the intrinsic capacity of a public network is very difficult to determine and may not be known.

On the Internet, what are the real causes of bandwidth degradation and delays that prevent a network connection from achieving the ideal capacity that a private circuit WAN could have? Packet loss is one cause of bandwidth degradation, since all time and effort spent to transmit a packet is lost if the packet must be retransmitted. At each network node, the routers and/or switches all have finite on-board computing resources with which to process incoming packets. Too many incoming packets means packets are buffered awaiting processing or, worse, are lost and require retransmission. Further delays are added to the transit time due to router overhead, packet fragmentation, and protocol translation. The finite bandwidth connecting a given node requires that when the amount of incoming traffic exceeds the outbound capacity, then transmission must be throttled to prevent packet loss. Unfortunately, in the public broadband world of the Internet, a priori knowledge of the bandwidth, network node configuration/capacity, etc. that a data packet is going to encounter through its entire route is difficult to determine or cannot be obtained before a packet is sent out for transmission. In contrast, the homogenous, static, switched network environment of the private circuit, Frame Relay WAN is a known, quantifiable, stable network environment that a user's data would encounter every time.

Given the "black box" nature of the public broadband Internet, today, then it is unlikely that there is a mathematical formula or empirically derived solution to the problem of network optimization. In fact, that is the case today, since network optimization is a manual process performed by a skilled communications engineer, only at the carrier or EP backbone level, where efficiencies on the highest capacity sections of the Internet offer the greatest rewards in increased capacity without additional capital investment. Network optimization in this form is often referred to as Traffic Engineering and is mostly performed by the Network Engineers on the backbone providers and ISPs. But without some type of optimization of the user's broadband connection, the user at the edge of the Internet can never fully utilize the capacity of the public broadband network that constitutes his connection to the WAN/Internet. Maximization of the transmission capacity from a location on the edge of a network requires a heuristic solution for the optimum configuration of communications parameters based on no knowledge of the inner workings of the Internet "black box" connecting the source and destination.

A public broadband connection typically provides very high speeds for WAN services at a lower cost compared to a private circuit connection. The ability to use a large amount of bandwidth when available at a low cost is compelling. However, there are shortcomings to public broadband connectivity that private circuit WANs avoid. First, the user must share the connection in some fashion with his fellow subscribers. In the case of xDSL, a group of local users must share the bandwidth coming out of the ISP's first point of presence (POP), where that group of DSL circuits is first consolidated. In the case of cable broadband, a group of users actually share a physical connection (ex. a coaxial cable running down the neighborhood street for cable TV and data). Fortunately, most Internet traffic is sporadic, random and asynchronous so many users can share a finite amount of bandwidth and have access to most of the maximum bandwidth for the duration of their session. Second, the user's data packets encounter an unknown and varying configuration of routing equipment that is used throughout the public broadband network. Not only are there multiple technologies (ex. xDSL, Satellite, Cable) available to connect to the Internet, but there are a large number of ISPs providing broadband services. Furthermore, each ISP is free to choose from another a large group of router and switch technology equipment manufacturers for the purposes of building/standardizing their own network infrastructure which the ISP then configures, maintains, updates and upgrades according to its own strategy and needs of its customers.

The user's low cost of broadband connectivity comes at the expense of thin profit margins for carriers or ISPs, which leaves few resources available to implement new routing technologies, much less upgrade existing technology. The outcome of this network environment is a competitive and incremental diversification of overlapping, but interconnected networks resulting in a broadband Internet that can only be described as a dynamic collection of transmission media and network node technologies. Contrastingly, in an expensive, private WAN environment, customers can feel comfortable that the equipment is uniformly maintained and upgraded by their chosen single carrier.

As discussed above, the inner workings of the public broadband, or Internet, may be viewed as a black box. A data packet may take any one of a plurality of routes through the Internet to get from a source computer to a destination server.

As an example, referring to FIG. 3, consider the physical path 50 of a data transmission 52, such as a 1500 byte frame, as it traverses the Internet 32 from its source computer 54 to a destination server 56. The user opens an application on the source computer 54 to initiate a network session. The source computer 54 then processes the data frame down its TCP/IP stack, adding the header data and sends the frame out the Ethernet adapter card, across a 10/100 bT cable over the LAN to the local router 58. This router receives this IP packet 52 from its Ethernet interface (eth1), which is physically connected to the source computer 54 via an Ethernet cable and the LAN switch. After the packet 52 enters eth1, the router 58 checks the frame for data integrity. The frame 52 is stored in the receive buffer on the router 58. The frame header is removed and only the data payload remains at the link layer. The router's forwarding engine sends the data to the router's other network interface eth2; the router 58 re-encapsulates the packet with a new link header with the destination address of the next router to receive the frame. The data part of the packet gets a new IP header with a new TTL, fragmentation offset, header checksum, source and destination address. The 1500 byte frame 52 leaves from the second interface eth2 towards the router at Local Telco 160.

The router at Local Telco 160 receives the frame on its interface eth0. Unfortunately, this router has a Maximum Transmission Unit (MTU) set at 1480 bytes, which means the incoming 1500 byte frame is too big for this router to process intact. This router receives the frame, strips off the header and breaks the frame up in to two parts (fragments), so that both frames (header+data) are less than 1480 bytes in size. Both frames then follow the same general routing process as described above. The forwarding engine sends the two packets to the correct outbound interface to the next destination router at Local ISP 162. If the next router requires even smaller frame sizes then it fragments the larger packet into smaller acceptable packets. It is noteworthy in this process that routers typically do not de-fragment data frames. The data is typically only reassembled after all the data frames have been received and ordered at the destination computer. In other words, in a typical example, fragmentation is a one-way street to network performance degradation.

Once the packets reach the Internet backbone 64, which is typically based on ATM switching over optical fiber (OC-12 between Carrier A 66 and Carrier B 68), each frame is multiplexed into 56 byte packets that are transmitted in parallel over multiple channels. After traversing any number of ATM switches, the packets are ultimately reassembled into frames of a default size determined by the parameters of the convergence sub-layer of the last downstream ATM switch at Carrier C 70. As the frames then traverse a network path, they are again subjected to the same IP routing as described above until they reach their destination 56 while running same risk of incurring fragmentation, delay and packet loss at each router along the way.

Most of the optimization work that is done today takes place at the time a new network connection is established or when additional network devices are added, if at all. Today, most equipment is taken out of the box, plugged in, tested for a connection and left. There are simply no tools to help optimize the WAN connection being used. Furthermore, referring to FIG. 4, different vendors supply different elements of the customer premise networking solution (often consisting of a router 72, firewall 74 and VPN server 76), install his portion of the transmission chain, perhaps optimize that component's performance based on internal measurements, declare success and leave. Furthermore, contiguous network optimization often cannot take place since the configuration of the different network devices compete with each other to set many of the critical network parameters. Often a compromise solution is reached just to get all three elements to work with each other at the end user's site. Often, the first or last device in the chain then dictates the network parameters for the data session, which compromises the performance of the other devices.

There are numerous disadvantages to this operational model. First, communications parameters for the whole transmission chain are never fully optimized at the start. Second, the parameters are never adjusted on a periodic or on-going basis to accommodate changes in the local Internet environment that affect network performance. Without analysis and optimization of key communication parameters, the available bandwidth is reduced by packet losses, fragmentation and partially empty data frames along the transmission path.

Because the migration to broadband WAN networks is a fairly recent phenomenon, the existing technology providers of the network infrastructure, such as the router, firewall and VPN engine manufacturers, do not presently provide the tools and flexibility in their products to operate in this new environment. The migration from a private circuit world to that of the public broadband Internet has monumental implications for not only the device manufacturers, but for the telecommunications providers of bandwidth and circuitry (aka the network carriers) as well. The carriers must evolve to better support the shared broadband network paradigm. In the past, telecom carriers managed their network from the inside looking outward. In other words, the carriers focus on bandwidth utilization, traffic engineering, and quality of service at the core of their network, with diminishing resources being devoted to areas far removed from the high bandwidth backbone. This was an appropriate allocation of financial and technical resources, since the private circuits on the edge of the network were not heavily utilized (single user, static configuration) and required little attention once installed and operational. Furthermore, in the past, the data traffic patterns of private circuit networks changed slowly over time, since each corporate network had its own circuit infrastructure and the backbone of the network would not experience dramatic changes in the amount or timing of peak network activity. Also, increased network traffic could be anticipated and planned for when an addition of a new corporate WAN was going to be added to a carrier's network or when significant changes to existing private WAN circuit configurations were scheduled to take place.

In the new paradigm of a shared, public broadband Internet, users compete for the available bandwidth when they initiate a data session, and can only utilize what is available for the duration of the session. In contrast, in the old private circuit world, there was a dedicated circuit with a known amount of capacity available for use at all times. In the public broadband configuration, both the user and the provider are now always operating in a dynamic network environment, as compared to the relatively static configuration of a private circuit WAN.

Unfortunately for the carriers, the new public broadband Internet has vastly increased the number of users, while drastically reducing the revenue associated with each user. With each user accepting whatever bandwidth is available at a given moment, carriers cannot charge premium prices for dedicated circuits and/or service level guarantees. Thus, right now, there is a need to maximize transmission capacity for an end user at each end of a broadband communications link, and there is a need for this optimization to occur as near real time as possible.

SUMMARY OF EMBODIMENTS OF THE INVENTION

In summary, in one embodiment, a system for optimizing communications between a first network device and a second network device connected through a plurality of nodes associated with a geographically-distributed heterogeneous network, comprises: a route determination module having a route tracing algorithm, where the route tracing algorithm determines a last common node along a route to the second network device within the geographically-distributed heterogeneous network that is furthest from the first network device; and a throughput testing module for transmitting data traffic between the first network device and the last common node, the throughput testing module having a throughput algorithm operable for determining a set of transmission variable values for the first network device associated with a maximum transmission capacity between the first network device and the last common node.

In the system as described above, the route may be selected from among a plurality of routes through the plurality of nodes and the actual route taken by data packets between the $1^{st}$ and $2^{nd}$ network devices is not determined/selected by either device.

In another embodiment, a method of optimizing a data transmissions from a first network device through a geographically-distributed heterogeneous network to a second network device comprises: identifying a last common node along a route to the second network device within the geographically-distributed heterogeneous network that is furthest from the first network device; and configuring the first network device with a set of transmission variable values associated with a maximum transmission capacity between the first network device and the last common node In the method as described above, the set of transmission variables values may be associated with physical and/or logical transmission variables.

Further, the logical transmission variable values may be independent of, or derived from, the physical transmission variable values. Additionally, a multivariable algorithm may be utilized to determine the set of transmission variable values. In yet another embodiment, a system for optimizing communications between a first network device and a second network device that utilize secure, encrypted data transmissions through a plurality of nodes associated with a geographically-distributed heterogeneous network, comprises: a throughput testing module for transmitting data traffic between the first network device and the second network device, the throughput testing module having a throughput algorithm operable for determining a set of transmission variable values for at least one of the first and second network devices, where the set of transmission variable values are associated with a maximum transmission capacity between the first and second network devices.

In the system as described above, the first network device may be one of a plurality of remote network devices, while the second network device may be a hub or core network device. In such a case, at least a portion of the set of transmission variable values associated with each of the plurality of remote network devices may be independently determined.

In another embodiment, a method of optimizing secure, encrypted data transmissions between a first network device and a second network device connected through a geographically-distributed heterogeneous network comprises: identifying an optimized set of transmission variable values, for a selected one of the first or second network devices, associated with a maximum transmission capacity from the selected network device to the other network device; and configuring the selected one with the optimized set of transmission variable values.

In yet another embodiment of a system for optimizing communications between a first network device and a second network device that utilize secure, encrypted data transmissions through a plurality of nodes associated with a geographically-distributed heterogeneous network, the system comprises a testing module for transmitting data traffic between the first network device and the second network device, the testing module having a throughput algorithm operable for determining a set of transmission variable values for at least one of the first and second network devices, where the set of transmission variable values are associated with a maximum transmission capacity between the first and second network devices.

In yet another embodiment of a method of optimizing secure, encrypted data transmissions between a first network device and a second network device connected through a geographically-distributed heterogeneous network, the method comprises identifying an optimized set of transmission variable values, for a selected one of the first or second network devices, associated with a maximum transmission capacity from the selected network device to the other network device; and configuring the selected one with the optimized set of transmission variable values.

In another embodiment, a system for maximizing transmission capacity between a first network device and a second network device connected through a plurality of nodes of a geographically-distributed communications network, comprises: an identification module having an optimization endpoint associated with the geographically-distributed communications network; a testing module having a data testing application operable to send representative test data to the optimization endpoint and to measure the data transmission capacity for a given set of transmission variable values associated with the first network device; and an optimization module having an optimization algorithm operable to analyze the given set of transmission variable values and the associated data transmission capacity and to determine an optimized set of transmission variable values associated with a maximum data transmission capacity from the first network device to the second network device.

In another embodiment, a method of maximizing transmission capacity between a first network device and a second network device connected through a plurality of nodes of a geographically-distributed communications network comprises: identifying an optimization endpoint associated with the geographically-distributed communications network; sending representative test data to the optimization endpoint and measuring the data transmission capacity for a given set of transmission variable values associated with the first network device; and analyzing the given set of transmission variable values and the associated data transmission capacity and determining an optimized set of transmission variable values associated with a maximum data transmission capacity from the first network device to the second network device.

DETAILED DESCRIPTION OF EMBODIMENTS OF THE INVENTION

Using the public broadband Internet for secure WAN services presents numerous challenges due to the multiplicity of providers and different technologies used by each provider. As data packets traverse the Internet from source to destination, the data frame can change size, format and/or sequence on each leg or node of its path or route. On each leg, the overall network performance between hosts can degrade due to delays and retransmissions triggered by protocol translation, buffer overflow, packet fragmentation, packet sequence errors and packet loss.

Figure 5:
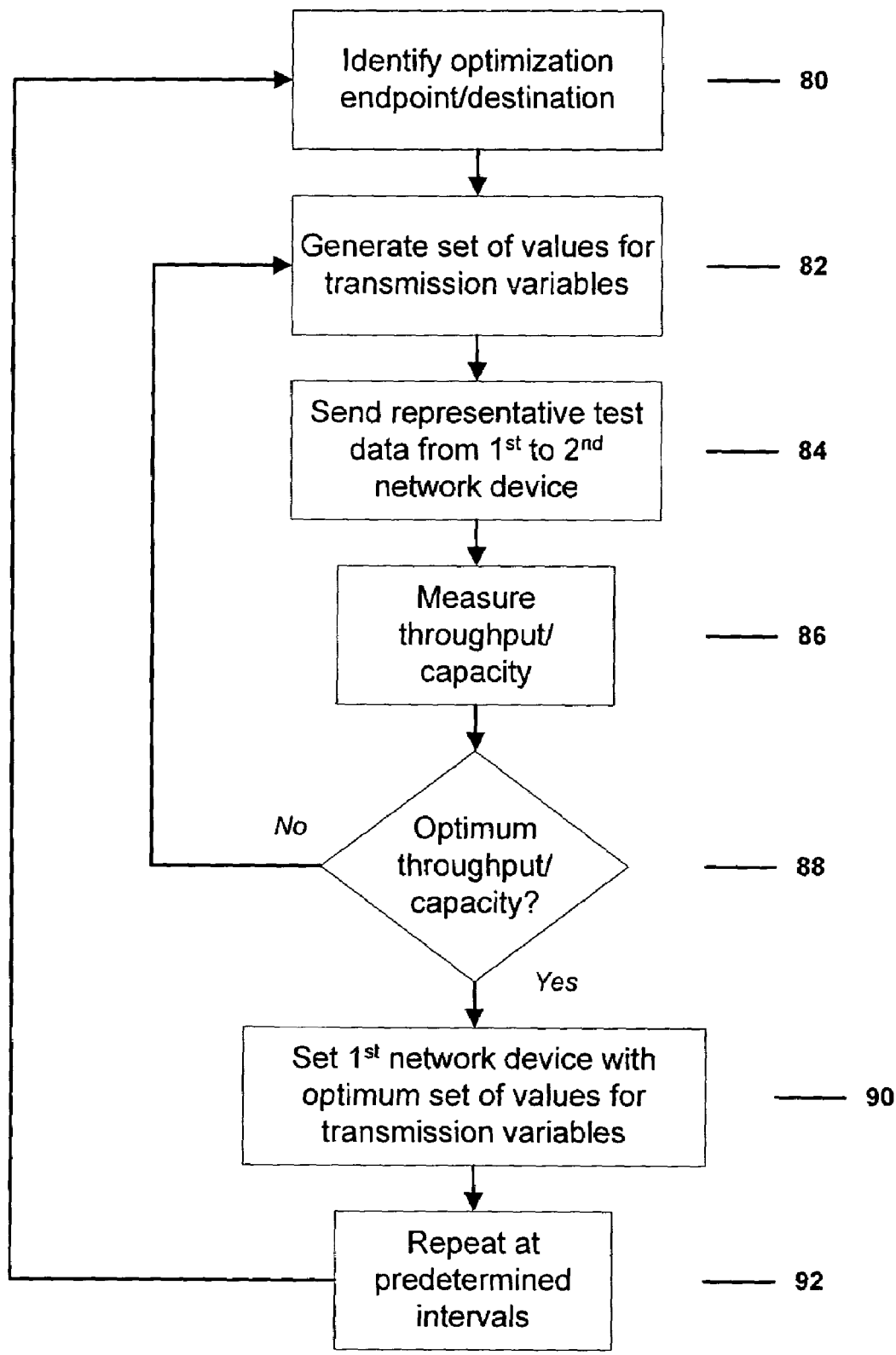
FIG. 5 is a flow chart of one embodiment of a method of broadband network optimization.

In one embodiment, referring to FIG. 5, in a method for optimizing broadband transmissions to minimize the performance degradation in a data session from a first network device or host to a second network device or host connected to a heterogeneous network, an optimization endpoint or destination is identified (Block 80). For example, for public communications on the Internet, the optimization endpoint or destination may be a network device that is found to be the last node or hop that a data packet consistently traverses before it is sent on one of the many possible routes through the Internet. This type of network device is located between the first network device and the core or backbone of the Internet. In contrast, for private communications on the Internet, such as through a VPN tunnel, the optimization endpoint or destination is the second network device, which is at the opposite end of the tunnel, across the entire Internet. The optimization method further includes generating one or more sets of values of transmission variables (Block 82). The transmission variables, and their associated values, may be physical and/or logical variables, and they may vary depending on whether the communication being optimized is a public communication or a private communication. A public communication may include any communication from a network device within a predetermined wide area network, such as the wide area network of a particular company, to any network location that is not part of the predetermined wide area network, such as any network device connected through the Internet. Further, a public communication is typically a non-protected or non-encrypted communication. In contrast, a private communication may include any communication between two network devices within the predetermined wide area network. Private communications are typically secure or encrypted transmissions that may or may not traverse the Internet. Test data representative of the type of communication desired to be optimized is then sent from the first network device to the second network device (Block 84). The representative test data may be data typical of private communications, such as client-server type data, or data representative of public communications, such a e-mail, web pages, etc. Further, the throughput or capacity of the representative test data associated with each set of values of transmission variables is measured (Block 86). The throughput values are compared, and the process is repeated until optimum values of transmission variables are found that result in the maximum throughput from the first network device to the second network device (Block 88). The first network device is then set with the optimum set of values of transmission variables (Block 90). This process may then be repeated at predetermined intervals (Block 92), depending on how often one believes that Internet transmission characteristics are changing. In the above method, a heuristic network testing may be used to determine the best communication parameters to minimize the negative effects of each hop across the Internet. A testing algorithm may be employed that performs a comprehensive adjustment of the communication parameters at each host or network device on a WAN on an initial, periodic or per session basis, resulting in enhanced overall network performance across a WAN that uses the public broadband Internet. By giving the administrator of the corporate WAN the ability to optimize data communications between his sites that are all linked via broadband connections to the Internet, the administrator gains control of his WAN performance without any dependence on the underlying carrier/provider. Since this testing algorithm treats the Internet as a "black box," it optimizes each site's connection to the "black box" from the edge of the network inwards, versus the carrier's traffic engineering methods that apply to the core of the network facing outwards.

In one embodiment, a system and method of Broadband Network Optimization (BNO) interrogates, analyzes and optimizes communications parameters associated with a network data transmission protocol, such as the OSI 7-Layer Network Model of Data Transmission, to significantly improve broadband throughput by reducing, for example, fragmentation, delays, and packet losses. Through a predetermined testing algorithm, the inter-dependencies between transmission variables are determined and optimized. Once optimum values are found and loaded, overall network device throughput through the broadband Internet connection is significantly improved and packet loss and fragmentation are greatly reduced.

Figure 6:
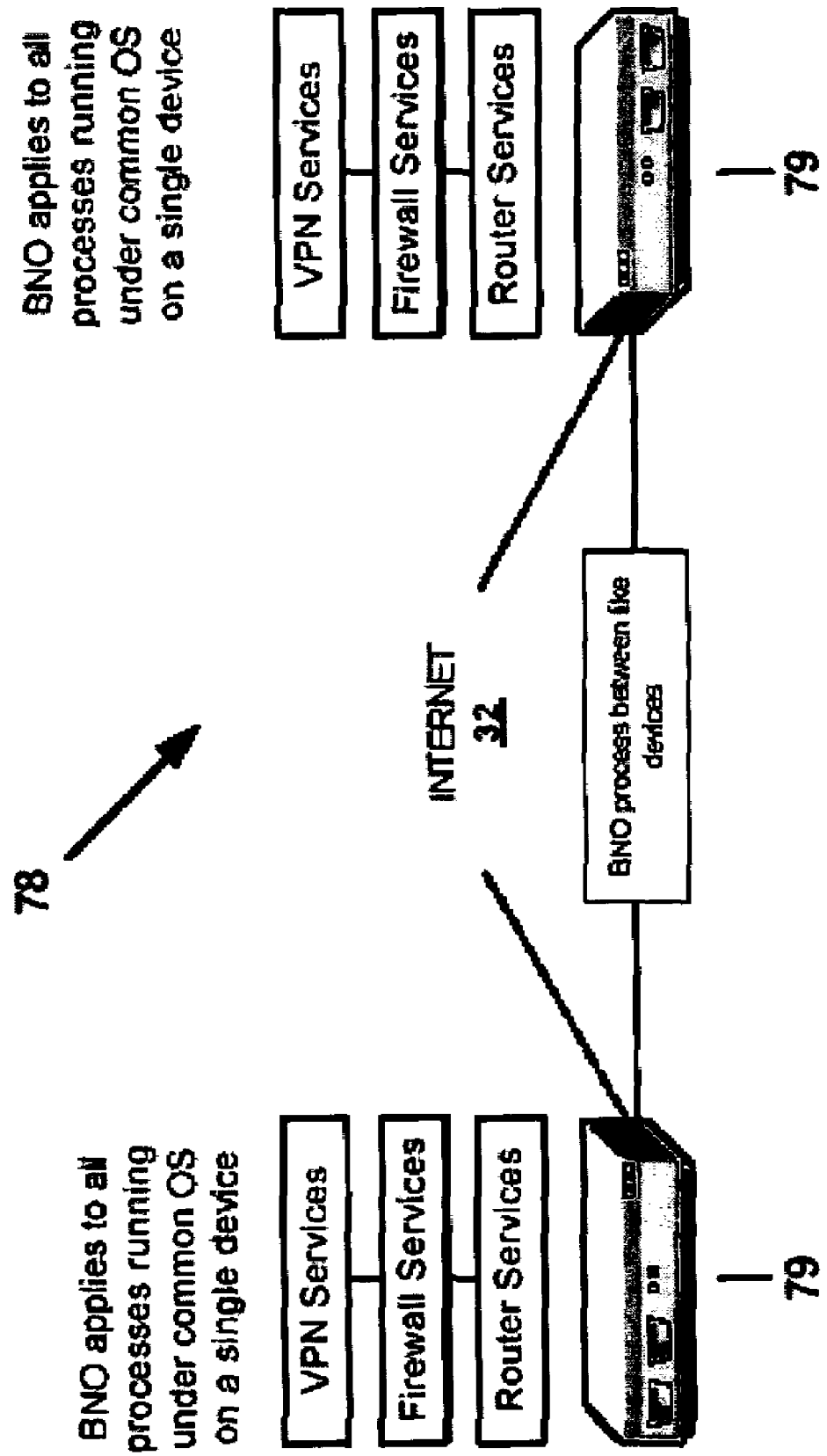
FIG. 6 is a schematic representation of one embodiment of a broadband optimization network device that integrates router, firewall and VPN functionality into a single device.
Figure 7:
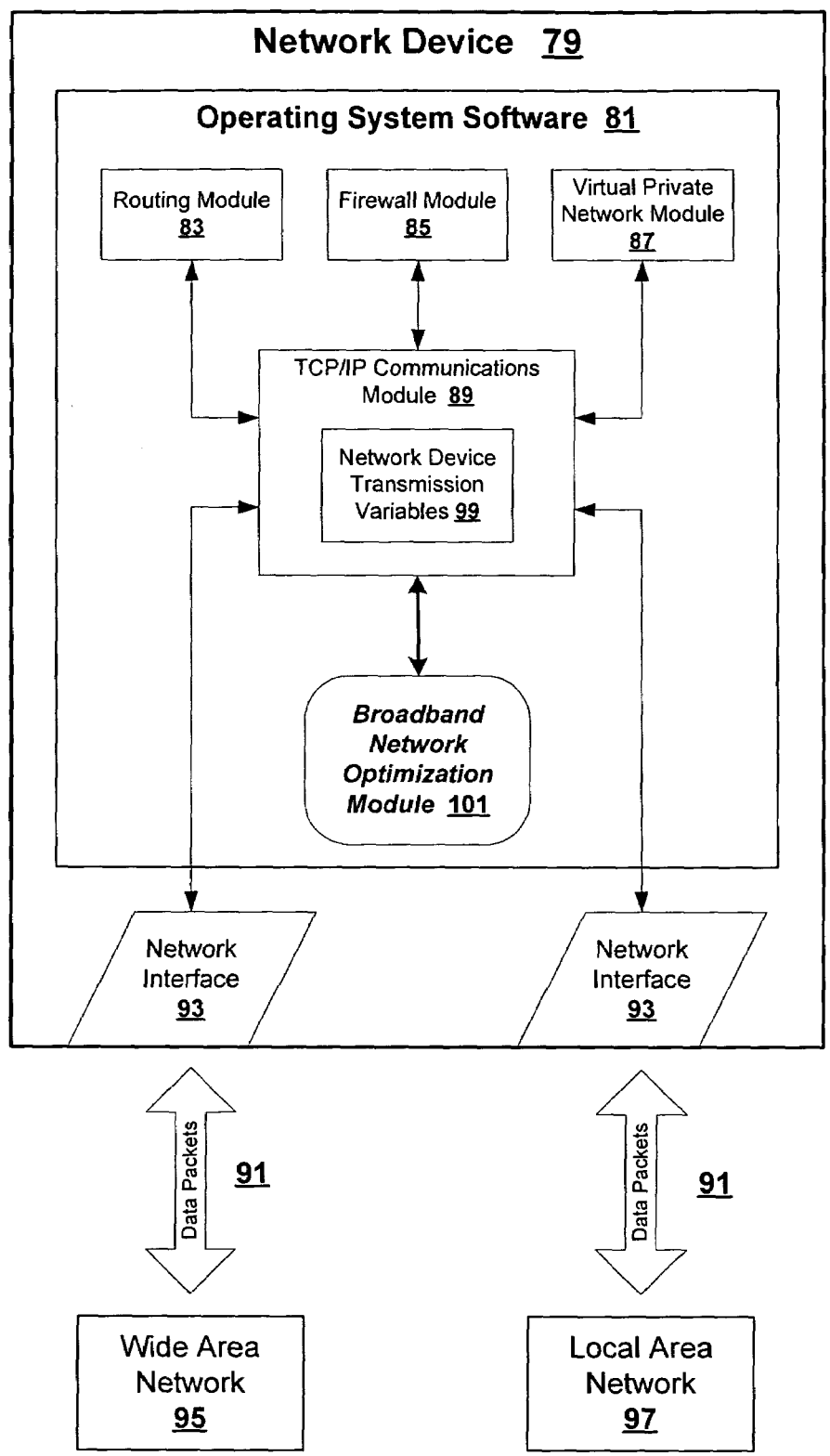
FIG. 7 is a schematic diagram of the device of FIG. 6 in communication with a Wide Area Network (WAN) and a Local Area Network (LAN)
Figure 8:
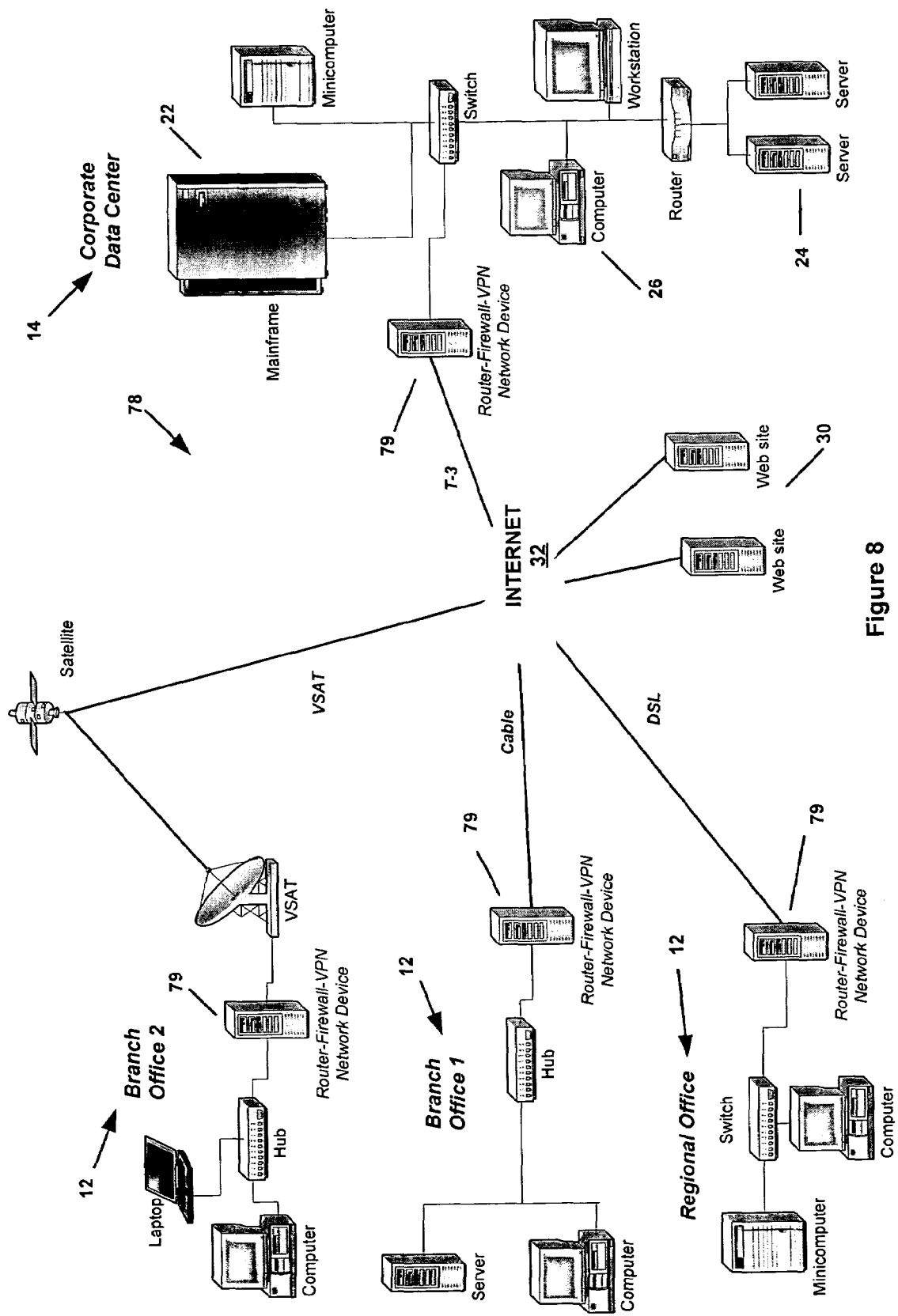
FIG. 8 is a schematic representation of a communications system having optimized broadband communications through the use of at least one network device having a broadband optimization module.

In one embodiment, referring to FIGS. 6-8, the BNO system 78 delivers the required network services for a broadband connection within a single network device 79 operating on a common operating system 81. For example, the required services for access via the Internet 32 to either a public site or to another private site on a corporate WAN may be described as: Router Services, Router-Firewall Services, or Router-Firewall-VPN Services. It should be noted, however, that rather than being implemented into a single network device, the BNO systems and methods may also be integrated into any individual network device. Referring specifically to FIG. 7, a routing module 83, firewall module 85 and virtual private network (VPN) module 87 respectively contain the appropriate software, hardware, firmware, memory, etc., to implement the desired routing, firewall and VPN services. A TCP/IP Communications Module 89 receives/transmits a data packet 91 through a network interface 93 to/from a Wide Area Network (WAN) 95 or a Local Area Network (LAN) 97. The router module 83 determines where the data packet 91 should be sent next. The firewall module 85 determines if the data packet 91 should be sent at all. And, the VPN module 87 determines if the data packet 91 is received from or intended to be transmitted to a private destination, and then respectively decrypts or encrypts the data packet. The transmission characteristics of data packet communications through the TCP/IP module 89 are established by the values of network device transmission variables 99. The network device transmission variables 99 include physical and logical variables associated with public and private communications. A broadband network optimization (BNO) module 101 optimizes the settings of the values of the network device transmission variables 99 to achieve maximum throughput of the data packets 91 for public and/or private communications. The BNO module 101 contains the appropriate hardware, software, firmware, memory, etc., to implement the broadband network optimization process. In particular, the BNO module 101 may include a route determination module, a throughput testing module and an optimization module that work together to respectively find a communications endpoint, test and measure data capacity to the endpoint, and optimize transmission variables within the associated network device to achieve the maximum communications throughput/capacity for one or both of public and private communications. The route determination module may include: one or more route tracing programs; one or more databases containing test data destinations; and one or more sets of traced route data. The throughput testing module may include: one or more throughput testing programs such as for measuring bandwidth, transit time, latency, jitter and data loss; one or more databases containing test data traffic, such a web/network based traffic and client/server based traffic; and a transmission module for sending and receiving the data. The optimization module may include: one or more optimization programs, including public/private and physical/logical variable algorithms as well as variable calculators and variable estimators, for determining values of combinations of transmission variables to achieve maximum data throughput; and one or more transmission variable databases that include initial, intermediate and optimized public/private and physical/logical variables. The application of the BNO module 101 and the integrated network device 79 within a broadband network is described below in more detail.

Referring specifically to FIG. 8, one embodiment of a BNO system 78 operating through a heterogeneous, public communications network 32, such as the Internet, includes the integrated network device 79 for providing maximum communications throughput between any two sites connected by network 32. For example, at one remote site 12 such as a regional office, remote devices such as minicomputers or local computers may communicate through a switch with network device 79 and transmit data through a Digital Subscriber Line (DSL) to the Internet 32. The communications from the regional office then may traverse a T-3 line to the corporate data center 14. The network device 79 at the corporate data center 14 then routes the communications to mainframe computers, minicomputers, local computers, workstations, servers, etc, possibly through other switches and/or routers. Similarly, a remote site 12, such as Branch Office 1, remote devices such as a server, and local desktop computer may communicate with network device 79 through a hub device, and then through a cable connection to the Internet 32 and to corporate data center 14. In another example, remote site 12 such as Branch Office 2 may include remote devices connected with network device 79, which then connects to the Internet 32 and the corporate data center 14 through a satellite communications system. It should be understood that the remote sites may also receive communications transmitted by the devices located at the corporate data center, other remote sites or any other site connected to the Internet 32. In any case, any communications that are transmitted through any network device 79 within system 78 are optimized for maximum transmission throughput/capacity by application of the broadband network optimization module 101 (FIG. 7) within the network device 79. As stated above, communications within the WAN defined by the corporate data center 14 and the remote sites 12 are considered private communications, while communications between the corporate data center 14 or the remote sites 12 and external websites 30 are considered public communications.

The BNO systems and methods optimize broadband connections by analyzing and managing several communications parameters. The communications parameters may be interdependent, and the analysis and management functions may be performed simultaneously on more than one variable. These variables or parameters include, for example, Frame Size, Frame Delay, transmit window size, and receive window size. The variables can be broken into 2 classes—physical variables and logical variables. Physical variables directly control the byte size and timing of the actual data frame. Logical variables determine how packets are stored, handled and processed. In one embodiment of an optimized configuration, the interdependencies of each of these variables are accounted for in the testing.

Even though there is always a maximum frame size and minimum delay value dictated by each different network topology, overall optimum performance between two hosts over the Internet may be attained by parameters vastly different than any of the parameter values associated with the different network topologies. For example, TCP/IP over Ethernet, which is the core Internet protocol, has a physical limit of 1500 bytes per data frame. This would suggest that there would be no performance benefit for an application to generate data frames larger than 1500 bytes for transmission via Ethernet. This may not be true, however, when examined through physical testing. For example, through the present systems and methods, it has been found that the application and presentation layers of the OSI Model can typically provide significantly better performance when the frame size used to communicate with the Ethernet technology is much larger than 1500 bytes. This may be a result of the efficiency of the lower levels of the OSI model and their ability to control the actual frame size and buffering as data is passed on to the Ethernet technology. Therefore, applications can benefit from using relatively large, for example up to 16 k byte or more, frame sizes when compared to the physical limit of associated network devices.

One embodiment of a system and method of BNO comprises a 4-step algorithm that creates an optimized communication environment for each one or combinations of the three network devices that are typically found on a site at the edge of a Internet based WAN: Router, Router-Firewall (RFW) and Router-Firewall-VPN server (RFV). This last configuration of Router-Firewall-VPN Server is a combination of network devices that replicates and surpasses the privacy and security features of a corporate WAN running over private circuits. For example, the Virtual Private Network Server provides point-to-point encrypted IPSec compliant or Multi Protocol Layer Switching (MPLS)-type secure communications between two hosts over the Internet.

Because broadband networks are used for both public (via a plain router) and private (via R-FW or R-FW-V) communications, the BNO systems and processes may be applied to both types of communications for optimum network performance. This is possible since the communications parameters that control each are unique to the private and public network processes employed. One embodiment of a BNO system and process can be broken down into two separate categories:

Public Access-Physical and Logical Communications Parameters, and

Private Access-Physical and Logical Communications Parameters.

Each step may contain a unique set of parameters and specific testing algorithms in order to configure network communications. These parameters are defined as Variables and Processes.

Variables

Testing and analysis for both Public and Private Access review the variables that control the various characteristics of data communications. The variables are divided into two groups, Physical and Logical. Some variables control all communications regardless of the type of access while others are unique to the public or private access being tested. Embodiments of the BNO systems and processes account for these differences and optimize each variable within each applicable type of access being optimized.

The physical variables control the communications protocols that dictate how data packets will be created and finally transmitted, including the size of each data packet and the transmission frequency. For example, one physical variable to be analyzed and configured is the Frame Size, or the number of bytes per data packet. In Ethernet terminology, this is termed the Maximum Transmission Unit (MTU) of the network interface that controls the total packet or frame size that will be transmitted by layer 2 to the Internet. The true maximum frame size for each network node or hop is physically determined based on the network technology used in a transmission protocol, such as at layer 1 in the OSI model. For example, in the case of Ethernet, the MTU is 1500 bytes; for ATM all packets are 56 bytes in size, and for Token Ring the MTU is 4096 bytes for the 4 Mbps version and 16,384 bytes for the 16 Mbps version. It would seem that this would be the end of the story since the layer 1 technology would dictate the ceiling in frame size. However, each transmission device, such as a router or switch device, in the path between the two hosts that wish to communicate will have a significant impact on what frame size is actually transmitted.

Each network device on the path has it's own unique communications parameters including an MTU. The operating systems of different manufacturers' networking products possess different protocols and different embodiments of those protocols to read and route data frames. For example, in most routing protocols, the actual packet length can be altered by the routing process. If a router adds router information to the header of a data frame, this will increase the frame size. When this data frame reaches the next router in its path, the frame size may exceed the MTU of this router, which will require the router to fragment the incoming packet and create two data packets to be transmitted onward. From this point forward through the path, what began as one frame has become two separate frames to transmit the original data payload. In reality this fragmentation doubles the path overhead since two data frames must be processed to transmit the same information that was previously carried in one data frame.

Another physical variable to be considered is the Frame Delay, which governs the time delay between the sending of sequential packets. This can also be thought of as a "frequency" at which data packets are put on the network at the physical layer. Although there are buffers and caching at all send and receive points in the communication path across the Internet, these storage elements can and are overrun when too much data converges on the same router from multiple sources at too rapid a frequency. Once the storage and cache buffers fill, no more data packets are accepted, which then requires the retransmission of the data packets that were lost due buffer overflow. By evaluating the entire data path, characteristics of the overall communication path can be determined and throughput metrics calculated. From this information, frequency requirements can be calculated that will enable communications to minimize buffer over runs and packet loss and the bandwidth degrading consequence of data retransmission.

The logical variables represent the communications parameters that control and manage the transmission and handling of the data packets rather than the size and timing of the packets themselves. Changing the physical variables may affect the values of the logical variables, but logical variables also may have independent values and settings that are not simply derived settings based on the value of the physical variables. In one embodiment, the BNO system and process tests and changes the following logical variables for TCP and UDP transmissions over an IP network:

ip_no_pmtu_disc—logical variable to disable or enable path maximum transmission unit discovery algorithm;

ipfrag_high_thresh—Maximum memory size used to reassemble IP fragments;

ipfrag_low_thresh—Minimum threshold memory size for fragmentation reassembly;

ipfrag_time—Time in seconds to keep an IP fragment in memory;

inet_peer_threshold—logical variable to increase buffer space for IP peer address storage;

inet_peer_minttl—minimum time-to-live of packets transmitted;

inet_peer_maxttl—maximum time-to-live of packets transmitted.;

tcp_retries1—derived value from RTO calculation for the number times a TCP packet is retransmitted in a currently established connection before giving up;

tcp_retries2—the number times a TCP packet is retransmitted in a currently established connection before giving up;

tcp_orphan_retries—number of retries attempted before killing an existing TCP connection;

tcp_max_orphans—increases the maximal number of TCP sockets not attached to any user file handle, held by system;

tcp_window_scaling—logical variable that enables window scaling as defined in IETF 1323;

tcp_timestamps—logical variable to turn on the process to create specific time stamps in the for IP packets;

tcp_sack—logical variable to use an alternate algorithm for handling retransmission instead of explicit congestion notification (ECN);

tcp_fack—logical variable that enables acks to account for all previous unacknowledged packets;

tcp_dsack—logical variable to allows the reception of duplicate sack/acks without triggering retransmission;

tcp_ecn—Explicit Congestion Notification allows the stack to monitor the ECN bit in TCP packets to determine if congestion exists along the path;

tcp_reordering—threshold value defines the number of packets that can be received out of order before considering them as loss or call for retransmission;

tcp_wmem—TCP socket send buffer memory sizes in bytes, has minimum, default and maximum values;

tcp_rmem—TCP receive buffer memory sizes in bytes, has minimum, default and maximum values;

tcp_mem—number of pages allowed for queuing by all TCP sockets;

tcp_app_win—reserve Reserve max(window/2^tcp_app_win, mss) of window for application buffer;

tcp_adv_win_scale—allocates memory space between application buffer and window size, rational number;

tcp_low_latency—logical variable controlling TCP algorithms that set values to deliver low latency over higher throughput; and mtu—Maximum Transmission Unit, data frame size in bytes.

Logical variables, such the above-listed variables, as a whole control how network devices handle IP data transmissions for both Public and Private communications. Some of the variables are common to Public and Private types of IP transmissions while others have distinct, separate and unique values depending on whether or not the data packet is being sent through a VPN tunnel to its destination.

Processes

Embodiments of the BNO systems and processes optimize data transmissions for public and/or private communications over a broadband connection to the Internet. These types of connections may be unique in both the location(s) being accessed and the nature of the traffic each type of access generates. The BNO systems and methods may tune each type of access independent of the other. Public access may be defined as general Internet based communications not destined for any single site. Suitable examples of public access communications include http, email, telnet and ftp activity where the user is accessing any number of remote web sites without pattern or order. Private access may be defined as communications between specific locations, such as a communications environment that is defined by a Virtual Private Network. The communications are unique in a VPN since the connection is between two specific sites and the traffic is typically more client-server based than typical web access. In a broadband connected location, both types of traffic occur; thus, the BNO systems and methods may tune both types of communication (public and private) to optimize the data transmission from that location.

Public Communications Optimization

Due to the dynamic nature of broadband communications, the path or route a data packet takes through a geographically-dispersed network of a plurality of nodes to reach a remote site can vary from one packet to the next. Each path can have it's own unique communications requirements making optimization difficult when looking at the entire path. BNO systems and methods address this fact by optimizing to what is called the Last Persistent Hop ("LHP"). LPH represents the last consistent network device, such as a router or switch, that Internet based traffic traverses from a particular site on the edge of the network. This path may be optimized by maximizing the overall network capacity of the connection, such as by reducing the trip time and increasing the speed at which the data packet is processed through the Internet. Embodiments of the present invention use the LPH optimization process to improve overall Internet access by tuning to the last point that is consistent in the overall path.

In one embodiment, to optimize the physical variables to the LPH includes a two-step process: identify the LPH and optimize to this destination. For example, there may be about 4-8 router or switch hops before reaching the Internet core backbone. All or at least of portion of these hops may be consistent regardless of the target website.

Figure 9:
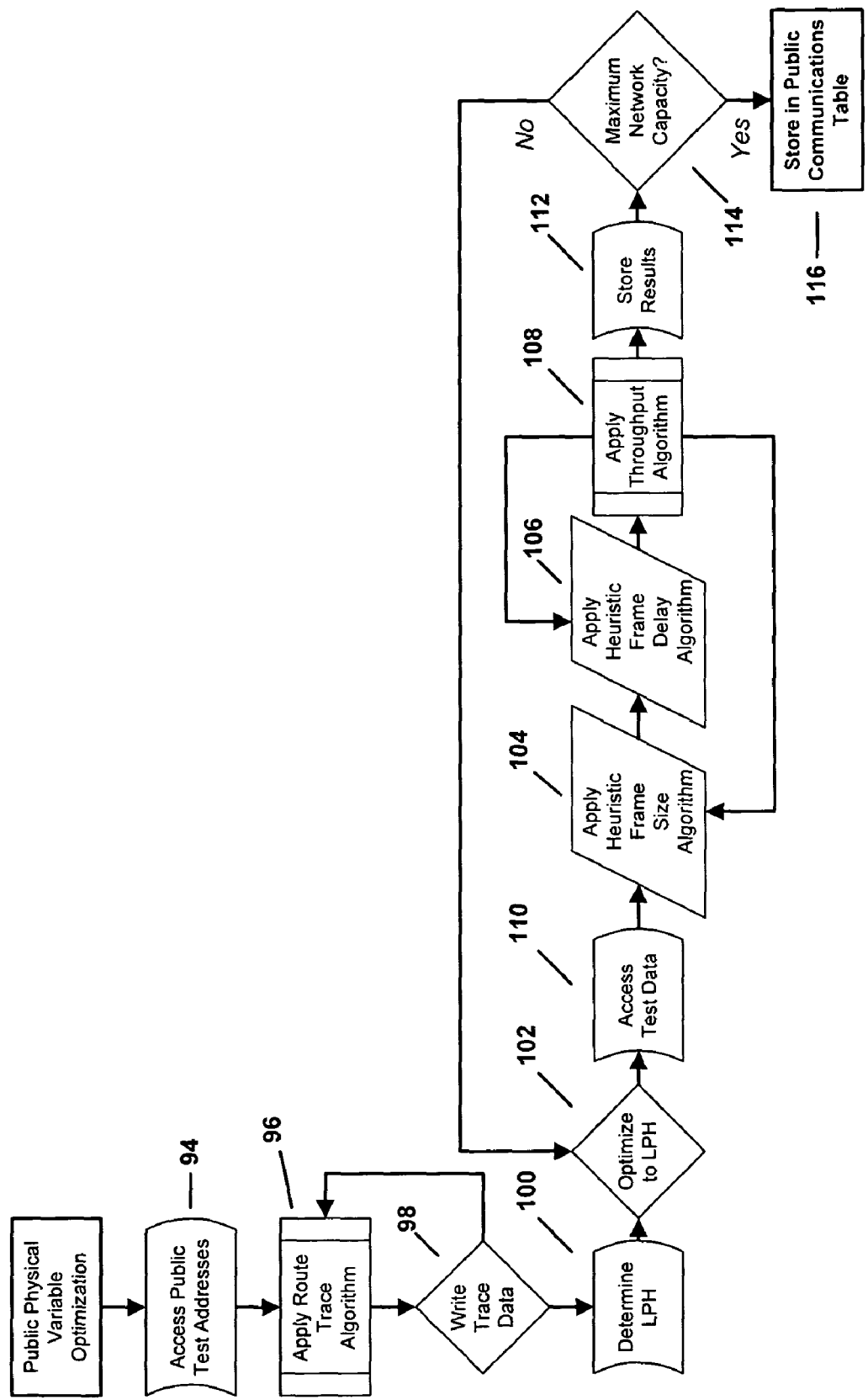
FIG. 9 is a flow chart of one embodiment of a public physical variable optimization method.

In one embodiment, referring to FIG. 9, a method of public physical variable optimization includes accessing a predetermined number of public test web sites to determine the LPH. For example, a variety of public test sites from different geographic regions may be utilized (Block 94). A Route Trace Algorithm may be used to provide a trace route that captures the address and name of each network device traversed by each site access (Block 96). Suitable examples of such a route trace algorithm may include programs such as: traceroute, traceroot, nanog and traceloop, which are examples of Unix, Linux and/or Windows programs. The traces are stored in an array where the address and sequence are saved from each test (Block 98). Once the testing is completed, the array is analyzed to determine the greatest common denominator of the route or path (Block 100). The address that is the farthest away from the host site is stored as the LPH.

Once the LPH is identified, the physical variables are optimized to the LPH (Block 102). A throughput algorithm is used to test directly to the LPH (Blocks 104, 106 and 108). The throughput algorithm measures network capacity by calculation of bandwidth and transit time between two hosts over the Internet. Suitable examples of Unix programs that provide this functionality are ttcp and iperf. The present embodiment of the invention includes a potentially multidimensional heuristic search algorithm that optimizes one or more physical variables, such as the Frame Size and Frame Delay, in a point-to-point process between the BNO host device and the LPH network device. Examples of heuristic algorithms include: breadth first search, depth first search, iterative breadth/depth, hill climb search, beam search, two-way search, island search, A* search, and Set A* search. In this embodiment, the optimization to the LPH utilizes test data (Block 110) that is designed specifically for Web-based traffic such as: http requests, telnet sessions, voice over IP, audio/video streaming and ftp file transfers. These types of data traffic are useful in optimizing the configuration of the Public Communications, which typically transmit these types of data. In some embodiments, to minimize the impact on varying bandwidth on the broadband connection, the BNO systems and processes repeat the test a predetermined number of times for each set of values, storing the results (Block 112), such as in an array. The predetermined number of times a test is repeated may vary, but is generally enough times such that a consistent average output value of the throughput algorithm is achieved. The throughput algorithm determines a network capacity associated with each set of transmission variable values. After testing a predetermined number of sets of transmission variable values, the throughput algorithm can evaluate the outputs and determine a set of transmission variable values associated with the highest transmission capacity (Block 114). When this maximum network capacity is determined, the associated values of the physical variables, such as the Frame Size and Frame Delay values, are stored, such as in a Public Communications Table (Block 116), and may be used in the optimization of the logical variables.

Figure 10:
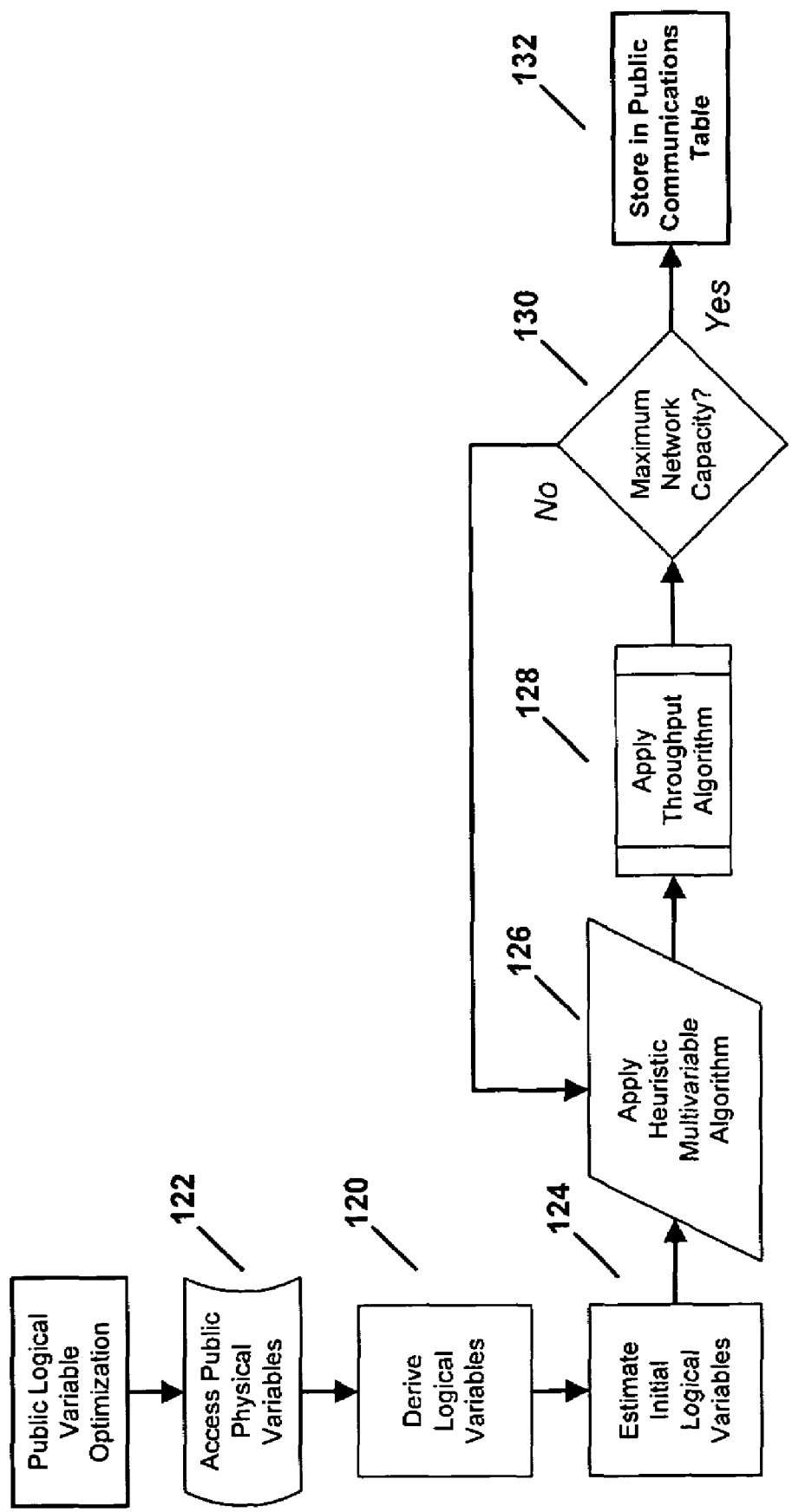
FIG. 10 is a flow chart of one embodiment of a public logical variable optimization method.

Referring to FIG. 10, in one embodiment, a method of public logical variable optimization includes explicitly deriving some public logical variables (Block 120) by calculation from the optimized public physical variables (Block 122). From the values of the public physical variables, initial estimated values are determined for the remaining public logical variables (Block 124). These estimated values of logical variables may be selected from a look up table, such as an empirically calculated table. Then, a multivariable heuristic algorithm may be utilized to search the state space of public logical variables, beginning at the initial estimated values and utilizing the same above-described throughput algorithm to test the values for network capacity to the LPH (Blocks 126 and 128). The throughput algorithm may measure, for example, available bandwidth, transit time, packet loss, packet fragmentation, congestion, jitter and latency. As such, the throughput algorithm may measure and gauge the effect of different sets of values of the public logical variables. Any one of the above listed heuristic algorithms can be used in the public logical variable optimization. In one embodiment of systems and methods for BNO, the following are the public logical variables tested for TCP or UDP over IP on the Linux operating system:

ip_no_pmtu_disc—logical variable to disable or enable path maximum transmission unit discovery algorithm;

ipfrag_high_thresh—Maximum memory size used to reassemble IP fragments;

ipfrag_low_thresh—Minimum threshold memory size for fragmentation reassembly;

ipfrag_time—Time in seconds to keep an IP fragment in memory;

inet_peer_threshold—logical variable to increase buffer space for IP peer address storage;

inet_peer_minttl—minimum time-to-live of packets transmitted;

inet_peer_maxttl—maximum time-to-live of packets transmitted;

tcp_retries1—derived value from RTO calculation for the number times a TCP packet is retransmitted in a currently established connection before giving up;

tcp_retries2—the number times a TCP packet is retransmitted in a currently established connection before giving up;

tcp_orphan_retries—number of retries attempted before killing an existing TCP connection;

tcp_max_orphans—increases the maximal number of TCP sockets not attached to any user file handle, held by system;

tcp_window_scaling—logical variable that enables window scaling as defined in IETF 1323;

tcp_timestamps—logical variable to turn on the process to create specific time stamps in the for IP packets;

tcp_sack—logical variable to use an alternate algorithm for handling retransmission instead of explicit congestion notification (ECN);

tcp_fack—logical variable that enables acks to account for all previous un-acknowledged packets;

tcp_dsack—logical variable to allows the reception of duplicate sack/acks without triggering retransmission;

tcp_ecn—Explicit Congestion Notification allows the stack to monitor the ECN bit in TCP packets to determine if congestion exists along the path;

tcp_reordering—threshold value defines the number of packets that can be received out of order before considering them as loss or call for retransmission;

tcp_wmem—TCP socket send buffer memory sizes in bytes, has minimum, default and maximum values;

tcp_rmem—TCP receive buffer memory sizes in bytes, has minimum, default and maximum values;

tcp_mem—number of pages allowed for queuing by all TCP sockets;

tcp_app_win—reserve Reserve max(window/2^tcp_app_win, mss) of window for application buffer;

tcp_adv_win_scale—allocates memory space between application buffer and window size, rational number;

tcp_low_latency—logical variable controlling TCP algorithms that set values to deliver low latency over higher throughput; and mtu—Maximum Transmission Unit, data frame size in bytes.

Once the heuristic search has converged to a specific set of values for the public logical variables (Block 130), the values are stored in the Public Communications Table (Block 132) where they are then used to configure the network devices. At this point in the BNO process, access to the Internet has been optimized for the public broadband connection being used.

Private Communications Optimization

Private Communications optimization takes place in a unique communications environment in a broadband world where both end points are known and consistent. For example, these end points may represent a point-to-point connection that is created by a Virtual Private Network based on IPSec standards or MPLS. IPSec compliant VPNs create connections between two or more sites across the Internet using tunnels to isolate traffic and encryption to ensure privacy while packets travel between locations. Due to the unique applications and processes used to create the tunnels in a VPN, broadband traffic functions differently in how data packets are addressed and processed by the network devices in the path.

Figure 1:
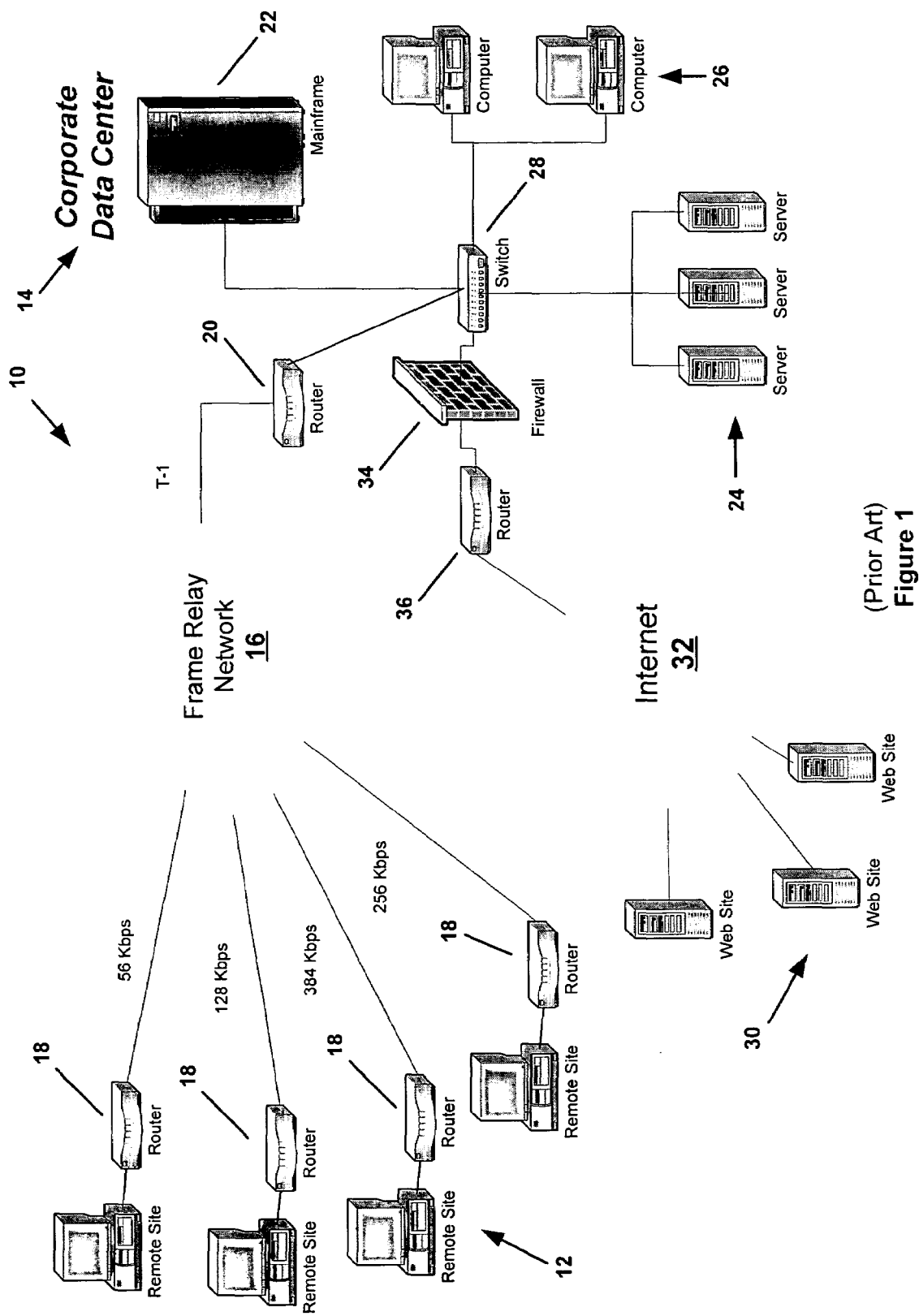
FIG. 1 is a schematic representation of a private circuit corporate wide area network (WAN)
Figure 2:
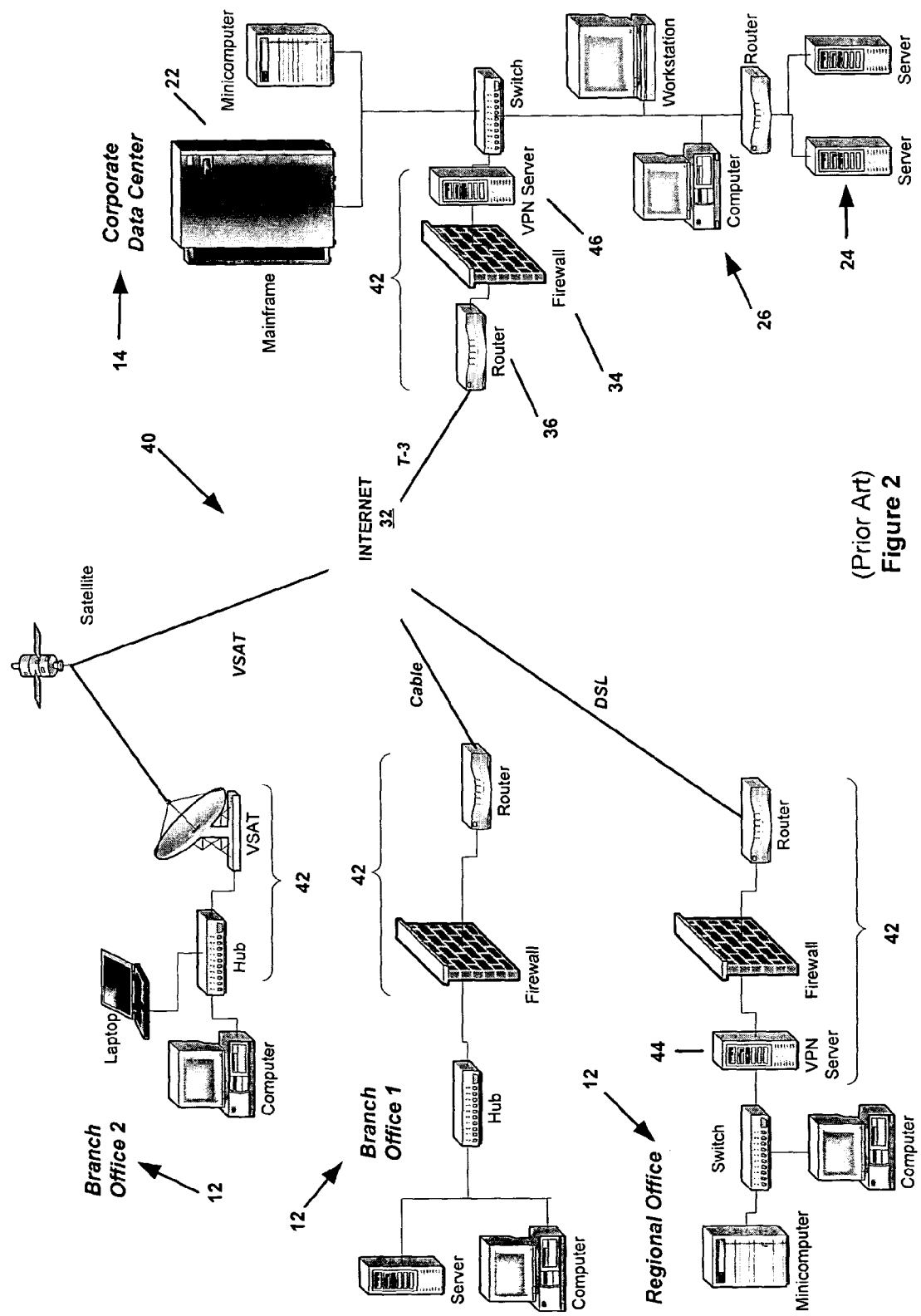
FIG. 2 is a schematic representation of a public broadband corporate WAN.
Figure 3:
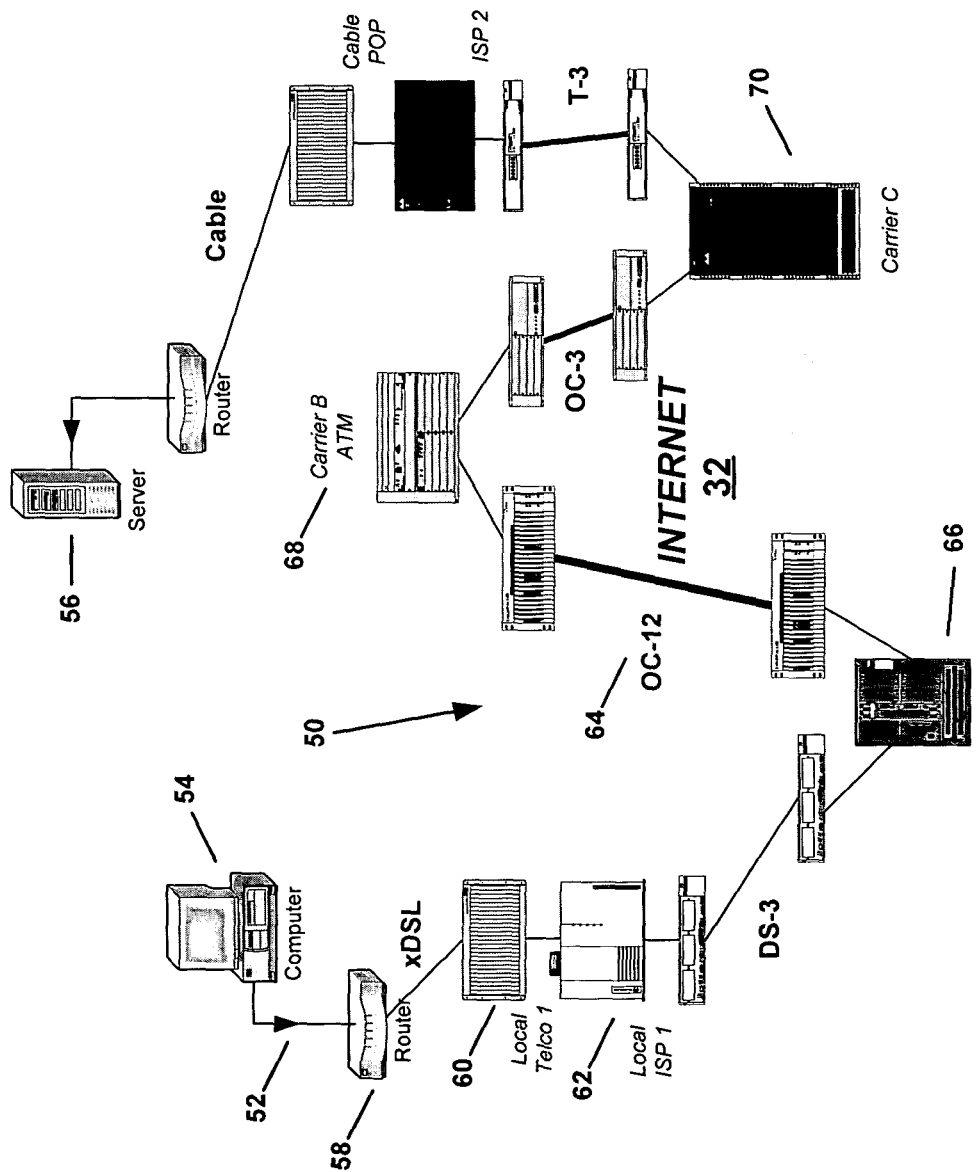
FIG. 3 is a schematic representation of a data transmission path from a source computer to a destination server through the Internet.
Figure 4:
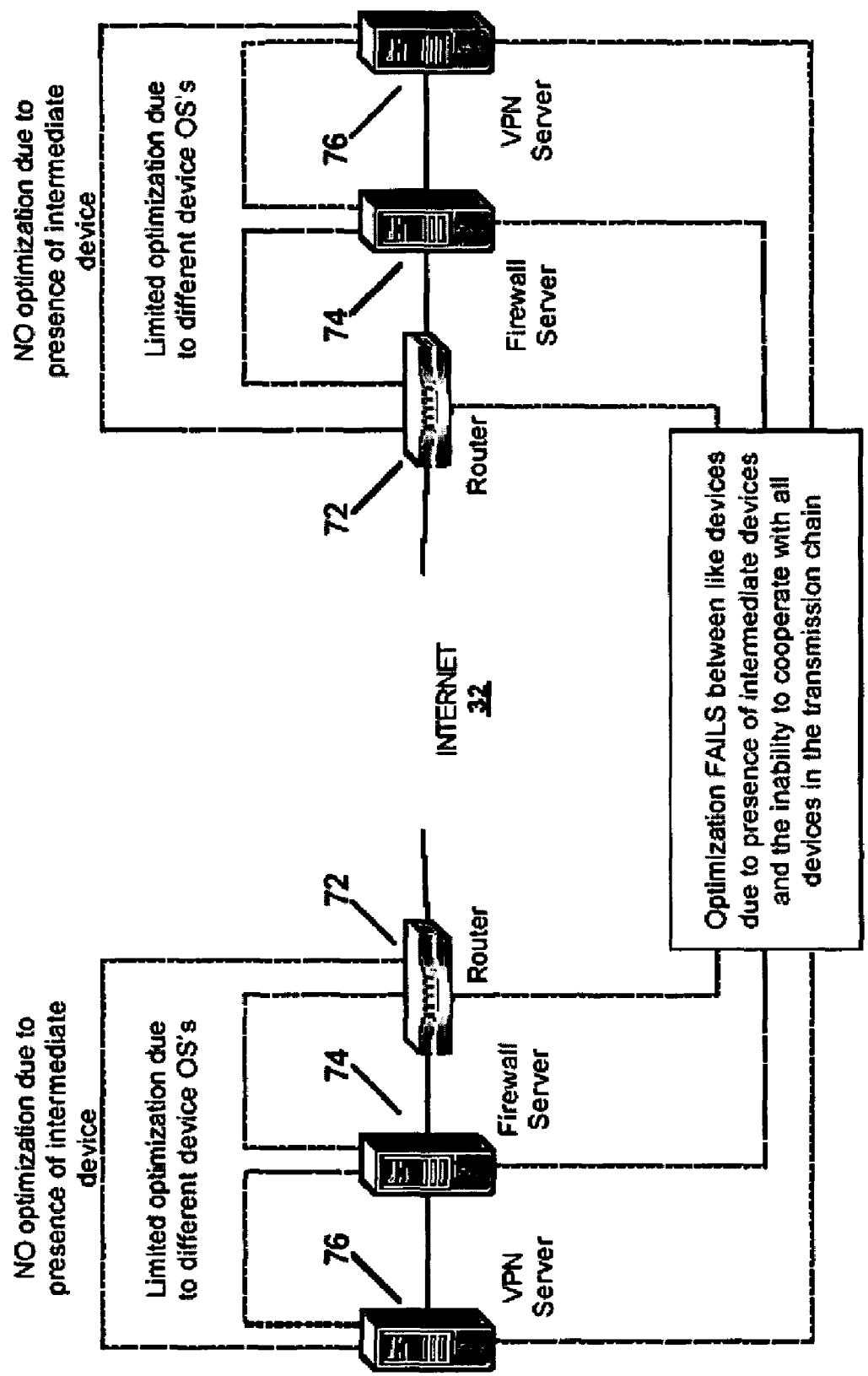
FIG. 4 is a schematic representation of a portion of a typical configuration for a point-to-point virtual private network (VPN) across the Internet.

A typical VPN environment includes a central site that is used to provide data and communications to a number of remote sites (see FIG. 2). In embodiments of the BNO systems and methods, the initial hub site can be optimized once when the first remote site comes online. Once this is done, additional remote sites may have their communications optimized to the hub site. The physical variables can be unique for each tunnel from the core site to each remote site. This may be the case when different values of the physical variables can be associated with each Security Association (SA), where the SA defines each separate tunnel on a VPN.

Figure 11:
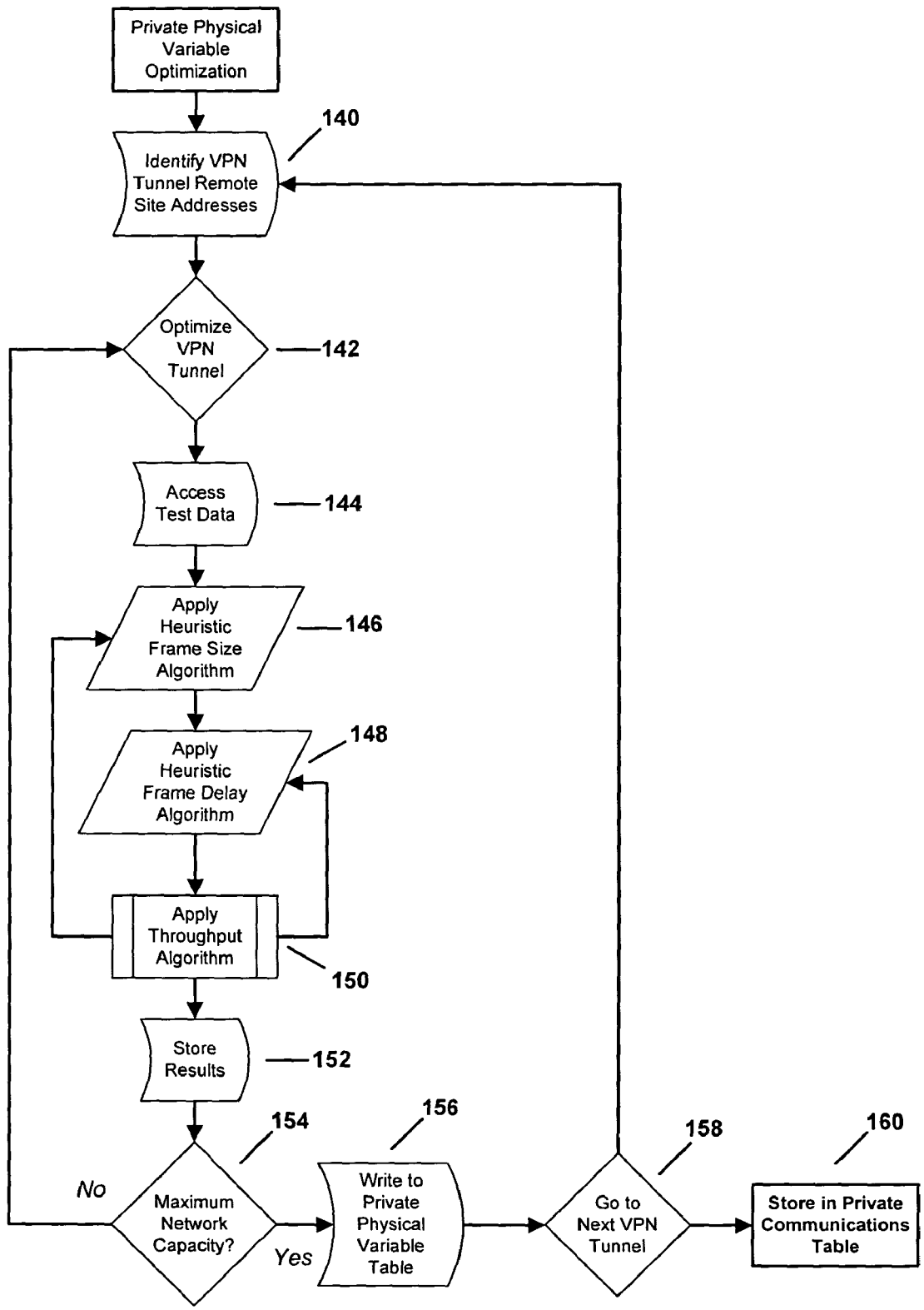
FIG. 11 is a flow chart of one embodiment of a private physical variable optimization method.

The systems and methods of optimizing the physical variables in a private communications VPN includes a testing process similar to that of determining the values of the physical variables associated with maximizing the capacity for optimizing public communications through the LPH. Referring to FIG. 11, in one embodiment, a private physical variable optimization method includes identifying the VPN tunnel remote site addresses (Block 140). Since a network device on each end of the VPN tunnel typically knows the address of the other end, testing for the frame size and delay can occur after the VPN service has been established. The private physical variables are optimized between the end points of the VPN tunnel (Block 142) using the same process as described above for the public physical variables, with a few specific differences. A different type of test data may be used (Block 144)in the throughput algorithm (Blocks 146, 148 and 150) since data traffic inside a VPN tunnel more resembles client/server communications as compared to Internet-based http, ftp and telnet type data. The data traffic in such a VPN environment may include data exchanged by enterprise client-server applications (e.g. SAP, PeopleSoft, Ariba, BEA Systems, and SQL queries into databases such as Oracle, DB2, or Microsoft SQL Server), and varying data formats (e.g. text, graphics, audio, video). However, it should be noted that the private communications optimization process does not have to utilize a specific type of data based on a given enterprise application. It is sufficient to use generic client/server data transmissions to optimize the VPN tunnel. After applying the throughput algorithm, the method includes storing the throughput results (Block 152) and comparing the stored results to determine whether or not maximum network capacity has been achieved (Block 154). The values of the private physical variables for the given VPN tunnel are stored when maximum capacity has been achieved (Block 156). The testing is repeated if maximum capacity has not yet been reached. Testing is done for each VPN tunnel defined by the common source site and each destination site (Block 158). The optimized private physical variables, such as Private Frame Size and Private Frame Delay, are stored for each separate VPN tunnel, thereby optimizing the communications regardless of the broadband service used at each site (Block 160). This end-to-end testing allows the frame size and frame delay variables to be optimized as a point-to-point process between the hub or core site and the remote site at the other tunnel end point.

Figure 12:
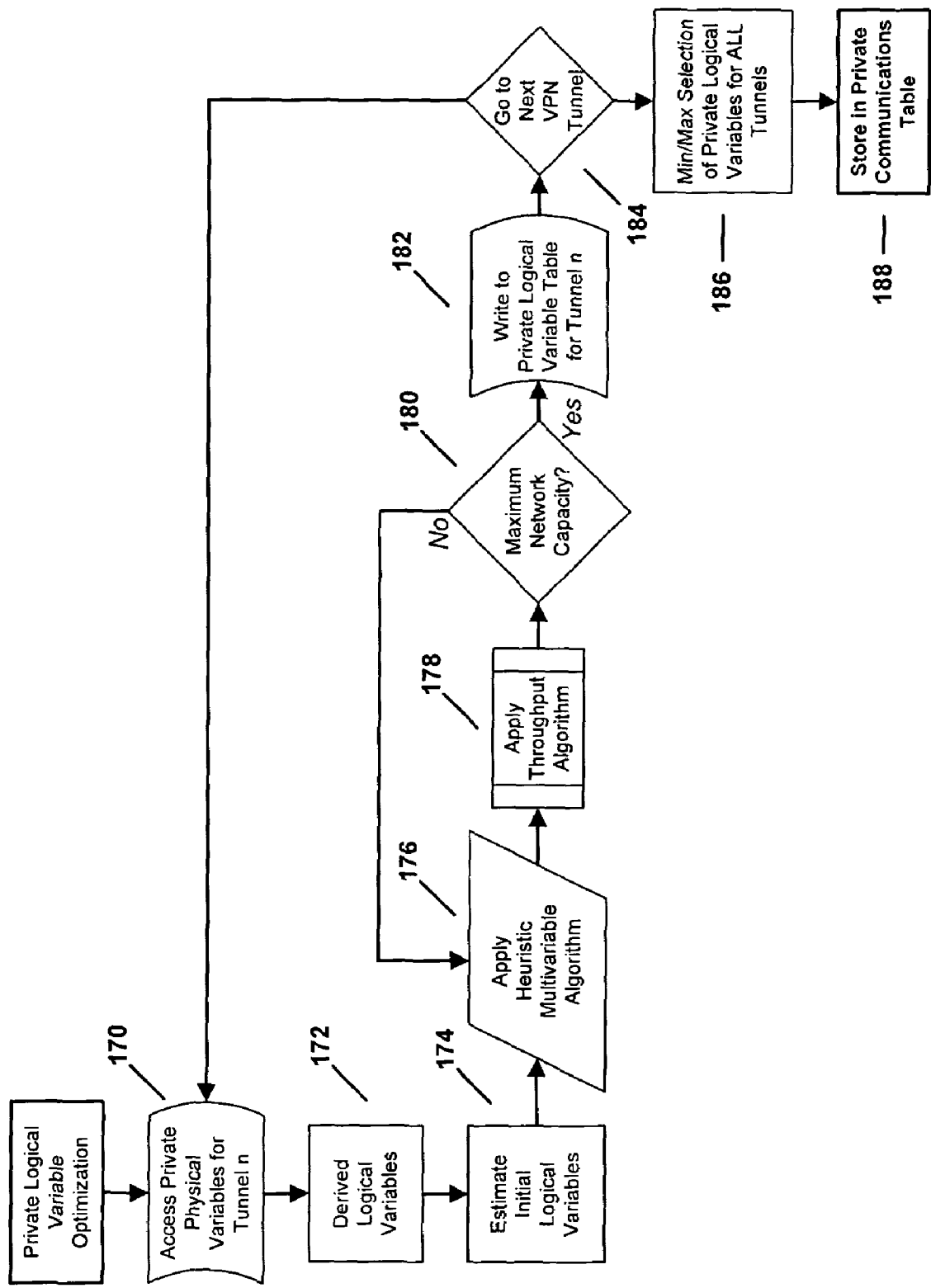
FIG. 12 is a flow chart of one embodiment of a private logical variable optimization method.

In one embodiment, referring to FIG. 12, a method of optimizing logical communication variables for private communications includes independently testing each remote site from the core site. Each remote site represents a separate peer-to-peer tunnel and potentially a different broadband technology at the remote site. To optimize the communications with each remote site, the process evaluates each tunnel connection to establish private logical variable settings in the same fashion as described above for the public logical variables, except the tunnel destination site is used instead of the LPH and client/server data may be used in the throughput algorithm. The method includes accessing the private physical variables for a given tunnel (Block 170). Some of the private logical variables may be derived from the private physical variables (Block 172), while the remaining variables are estimated (Block 174). A throughput algorithm is applied (Blocks 176 and 178), and the throughput results are analyzed to determine of the maximum throughput has been achieved (Block 180). If not achieved, the testing is repeated. If achieved, the optimized private logical variable values are stored (Block 182) and the process is repeated for the next VPN tunnel (Block 184). Since logical variables may be specific to the IP stack process in the operating system, unique values of the private logical values may not be able to be used for each separate VPN tunnel. Thus, typically the private logical variables are common to all VPN tunnels from a given host. All the sets of values for the private logical variables for each tunnel are stored, such as in an array, and values for each private logical variable are selected in a minimum or maximum fashion that optimizes all VPN tunnels (Block 186). Such selected values are stored (Block 188), such as in an array or a Private Communications Table, and applied to each network device.

For example, in one embodiment of a system and method of BNO, the following private logical variables for TCP or UDP over EP are determined for all VPN tunnels and private communications are optimized for the VPN tunnels defined at that point:

ip_no_pmtu_disc—logical variable to disable or enable path maximum transmission unit discovery algorithm;

ipfrag_high_thresh—Maximum memory size used to reassemble EP fragments;

ipfrag_low_thresh—Minimum threshold memory size for fragmentation reassembly;

ipfrag_time—Time in seconds to keep an IP fragment in memory;

inet_peer_threshold—logical variable to increase buffer space for IP peer address storage;

inet_peer_minttl—minimum time-to-live of packets transmitted;

inet_peer_maxttl—maximum time-to-live of packets transmitted;

tcp_retries1—derived value from RTO calculation for the number times a TCP packet is retransmitted in a currently established connection before giving up;

tcp_retries2—the number times a TCP packet is retransmitted in a currently established connection before giving up;

tcp_orphan_retries—number of retries attempted before killing an existing TCP connection;

tcp_max_orphans—increases the maximal number of TCP sockets not attached to any user file handle, held by system;

tcp_window_scaling—logical variable that enables window scaling as defined in IETF 1323;

tcp_timestamps—logical variable to turn on the process to create specific time stamps in the for IP packets;

tcp_sack—logical variable to use an alternate algorithm for handling retransmission instead of explicit congestion notification (ECN);

tcp_fack—logical variable that enables acks to account for all previous unacknowledged packets;

tcp_dsack—logical variable to allows the reception of duplicate sack/acks without triggering retransmission;

tcp_ecn—Explicit Congestion Notification allows the stack to monitor the ECN bit in TCP packets to determine if congestion exists along the path;

tcp_reordering—threshold value defines the number of packets that can be received out of order before considering them as loss or call for retransmission;

tcp_wmem—TCP socket send buffer memory sizes in bytes, has minimum, default and maximum values;

tcp_rmem—TCP receive buffer memory sizes in bytes, has minimum, default and maximum values;

tcp_mem—number of pages allowed for queuing by all TCP sockets;

tcp_app_win—reserve Reserve max(window/2^tcp_app_win, mss) of window for application buffer;

tcp_adv_win_scale—allocates memory space between application buffer and window size, rational number;

tcp_low_latency—logical variable controlling TCP algorithms that set values to deliver low latency over higher throughput; and mtu—Maximum Transmission Unit, data frame size in bytes.

As mentioned above, for each separate Logical Variable, an optimized value may be calculated and stored in the Private Communications Table. At this point in this embodiment of a system and method for BNO, access to each remote site connected with a private tunnel has been optimized.

Implementation of the BNO Process

The BNO process can be run as frequently as either needed or desired. The process may be configured to automatically run each time the network device is booted and/or whenever a network adapter is installed or restarted. Additionally, the BNO process can be set to run as a timed event on a preset schedule. Further, the BNO process could be run before each data session is initiated by an application.

In one embodiment, for example, a system and method of BNO utilizes a network device that combines the functions of a router, firewall and VPN server onto a machine with an Intel-based processor running a version of the Linux operating system. For example, an IPv4 and IPv6 compliant router and firewall software along with an IPSec compliant VPN engine may include an embodiment of the above-described BNO methods and systems. Such a combined device including the systems and methods of BNO generally may operate in a manner such that each independent component of the combined device does not alter by itself any of the physical and/or logical variables. However, the BNO systems and methods are independent of the hardware platform and operating system; the systems and methods could be ported to any type of the Unix operating system, Windows NT/2000/XP, Macintosh and a variety of real time OS's such as VxWorks and others. While the physical and logical variables listed above are specific to TCP and UDP over IP, the BNO methods and systems can be applied to other transport protocols as well, and are independent of the physical medium of the network: copper twisted pairs, copper coax, optical fiber, wireless IR and RF carriers, satellite, short haul microwave, and so forth.

In one aspect, the systems and methods of BNO provide a level of network optimization on an automated algorithmic basis. The systems and methods of BNO may include an algorithm that tests actual data throughput information and selects parameter values on the basis of these tests. The BNO systems and methods may be implemented in any combination of software, hardware, firmware and other similar electronic mediums.

In another aspect, the systems and methods of BNO optimize communications for point-to-point VPN tunnels between hosts. When the systems and methods of BNO are used in a VPN environment, they may provide a separate and unique set of parameters specific to each VPN tunnel from a given site to all the specified VPN destinations. Each site in this instance may have unique broadband communication variables since each destination's broadband connection to the Internet is likely to be different. Additionally, a VPN tunnel is not necessarily symmetric, even though the two sites are connected via a dedicated tunnel. Packets sent from one end of the tunnel may take different paths across the Internet relative to packets sent from the other end of the tunnel. Thus the values for the physical and logical variables for the two hosts may differ due to local network conditions and the different paths the packets may travel. By using the remote VPN host as the test destination and applying the systems and methods of BNO on each host, each host ends up with its own set of communications parameters and the end result is a fully optimized duplex VPN tunnel.

Although embodiments of the invention have been described and illustrated in detail, it is to be clearly understood that the same is intended by way of illustration and example only and is not to be taken by way of limitation. Accordingly, variations in and modifications to the present invention will be apparent to those of ordinary skill in the art, and the following claims are intended to cover all such modifications and equivalents.

What is claimed is:

1. A system on a computer for optimizing communications between a first network device and a second network device connected through a plurality of nodes associated with a communications network, comprising:
a route determination module having a route tracing algorithm, wherein the route tracing algorithm is operable to determine a last common node from the first network device traversed by at least two data packets sent from the first network device, wherein the route determination module further comprises at least two route tracing test destinations located within the communications network, wherein the route determination module is operable to send a route tracing test data packet from the first network device to the at least two route tracing test destinations and trace a respective route taken by each respective route tracing test data packet, wherein the last common node is a node furthest from the first network device that is common between each route; and
a throughput testing module for transmitting data traffic between the first network device and the last common node, the throughput testing module having a throughput algorithm operable, based on transmitted data traffic, for determining a set of transmission variable values for the first network device associated with a maximum transmission capacity between the first network device and the last common node, wherein the throughput testing module further comprises at least two sets of test transmission variable values, wherein the throughput testing module is further operable to transmit a throughput testing test data packet to the last common node and measure a corresponding transmission capacity when the first network device is configured with each of the at least two sets of test transmission variable values, wherein the throughput algorithm is further operable to analyze each of the at least two sets of test transmission variable values and the corresponding-transmission capacity and determine the set of transmission variable values associated with the maximum transmission capacity.

2. The system of claim 1, wherein a data packet route from the first network device to the second network device is variable after the last common node.

3. The system of claim 1, wherein at least a portion of a data packet route between the last common node and the second network device comprises a variable combination of at least a portion of the plurality of nodes.

4. The system of claim 1, wherein the last common node comprises the second network device.

5. The system of claim 1, wherein at least two of the at least two route tracing test destinations are located in substantially different geographic regions of the communications network.

6. The system of claim 1, wherein the at least two sets of test transmission variable values comprise physical transmission variables.

7. The system of claim 6, wherein the physical transmission variables comprise at least one of public communications transmission variables and private communications transmission variables.

8. The system of claim 6, wherein the physical transmission variables comprise at least one of Frame Size and Frame Delay.

9. The system of claim 6, wherein the physical transmission variables are associated with bandwidth or transit time.

10. The system of claim 1, further comprising a logical variable derivation module having a derivation algorithm operable for deriving a set of logical transmission variables values from a set of physical transmission variable values, wherein the at least two sets of test transmission variable values comprise the set of physical transmission variable values and the set of logical transmission variable values.

11. The system of claim 1, wherein the at least two sets of test transmission variable values comprise logical transmission variables.

12. The system of claim 11, wherein the logical transmission variables comprise at least one of public communication logical transmission variables and private communication logical transmission variables.

13. The system of claim 11, wherein the logical transmission variables comprise at least one of a variable that controls Disabling or enabling a path maximum transmission unit discovery algorithm, Maximum memory size used to reassemble IP fragments, Minimum threshold memory size for fragmentation reassembly, Time in seconds to keep an IP fragment in memory, Buffer space for IP peer address storage, Minimum time-to-live of packets transmitted, Maximum time-to-live of packets transmitted, Number times a packet is retransmitted in a currently established connection before giving up, Number of retries attempted before killing an existing connection, Maximal number of sockets not attached to any user file handle, Window scaling, Creating specific time stamps for IP packets, Use of an alternate algorithm for handling retransmission instead of explicit congestion notification (ECN), Enabling acks to account for all previous un-acknowledged packets, Reception of duplicate sack/acks without triggering retransmission, Explicit Congestion Notification to determine if congestion exists along a path, a Threshold defining the number of packets that can be received out of order before considering them as lost or calling for retransmission, Send buffer memory size, Receive buffer memory size, Number of pages allowed for queuing by all sockets, Reserve memory size of window for application buffer, Memory space between application buffer and window size, an Algorithm that set values to deliver low latency over higher throughput, and Maximum Transmission Unit data frame size.

14. The system of claim 1, wherein the at least two sets of test transmission variable values comprise private communications transmission variables.

15. The system of claim 1, wherein the at least two sets of test transmission variable values comprise public communications transmission variables.

16. The system of claim 1, further comprising a predetermined set of test data usable by the throughput testing module to determine the at least two sets of test transmission variable values, wherein the predetermined set of test data is associated with a type of communications to be optimized.

17. The system of claim 16, wherein the predetermined set of test data comprises at least one of private communications-type data and public communications-type data.

18. The system of claim 16, wherein the predetermined set of test data comprises at least one of client/server-type data and Internet-type data.

19. The system of claim 1, wherein the throughput testing module is further operable to determine interdependencies between respective transmission variables associated with the at least two sets of test transmission variable values.

20. The system of claim 1, wherein the throughput testing module is operable to simultaneously analyze more than one respective transmission variable associated with the at least two sets of test transmission variable values.

21. The system of claim 1, wherein the last common node is a furthest node in a sequence of nodes extending from the first network device, wherein the sequence of nodes ending at the last common node is shared by each route taken by each respective route tracing data packet.

22. The system of claim 1, wherein the set of transmission variable values comprises one of the at least two sets of test transmission variable values.

23. The system of claim 1, wherein the throughput algorithm is further operable, for each of the at least two sets of test transmission variable values, to transmit the throughput testing test data packet from the first network device to the last common node a predetermined number of times thereby resulting in a plurality of test data transmission capacities for each of the at least two sets of test transmission variable values, wherein the test data transmission capacity corresponding to a respective one of the at least two sets of test transmission variable values is based on the corresponding plurality of test data transmission capacities.

24. A method of optimizing data transmissions from a first network device through a communications network to a second network device comprising:
 identifying a last common node along a route to the second network device within the communications network that is furthest from the first network device, wherein identifying further comprises:
  sending test data to at least two test sites located within the communications network;
  tracing the route taken by the test data to each of the at least two test sites; and
  comparing the traced routes to determine the last common node; and
 configuring the first network device with a set of transmission variable values associated with a maximum transmission capacity based on transmitted test data traffic between the first network device and the last common node, wherein configuring further comprises:
  generating a plurality of sets of test transmission variable values;
  configuring the first network device with each of the plurality of sets of test transmission variable values;
  transmitting at least one test data packet to the last common node while the first network device is configured with each respective one of the plurality of sets of test transmission variable values; and
  measuring a transmission capacity to the last common node of each transmission to determine the set of test transmission variable values associated with the maximum transmission capacity.

25. The method of claim 24, wherein the plurality of sets of test transmission variables values comprises at least one of physical transmission variable values and logical transmission variable values.

26. The method of claim 25, further comprising deriving at least a portion of the logical transmission variable values from the physical transmission variable values.

27. The method of claim 25, further comprising determining at least a portion of the logical transmission variable values independently from the physical transmission variable values.

28. The method of claim 24, wherein the plurality of sets of test transmission variable values comprises at least one of public communication transmission variable values and private communication transmission variable values.

29. The method of claim 24, further comprising determining the plurality of sets of test transmission variable values using a multivariable algorithm.

30. The method of claim 24, wherein the at least two test sites are located in substantially different geographic regions of the communications network.

31. The method of claim 24, wherein transmitting further comprises:
 transmitting at least one predetermined set of test data to the last common node while the first network device is configured with each of the plurality of sets of transmission variable values.

32. The method of claim 24, wherein the last common node comprises the second network device.

33. The method of claim 24, wherein identifying the last common node further comprises identifying a furthest node in a sequence of nodes extending from the first network device, wherein the sequence of nodes ending at the last common node is shared by each route taken by the respective test data.

34. A system on a computer for optimizing communications between a first network device and a second network device, comprising:
 a first testing module operable to transmit a first set of test data traffic from a selected one of the first network device and the second network device, the first testing module having a first throughput algorithm operable to determine a first set of transmission variable values for the selected one of the first network device and the second network device, where the first set of transmission variable values are associated with a first maximum transmission capacity based on the transmitted first set of test data traffic from the selected one of the first network device and the second network device to a first respective last common node from among a first plurality of routes, through a network, traversed by a first set of at least two test data packets sent from the selected one of the first network device and the second network device;
 wherein the first testing module further comprises a first route determination module comprising a first set of at least two route tracing test destinations located within the network, wherein the first route determination module is operable to send route tracing test data packets from the selected one of the first network device and the second network device to the first set of at least two route tracing test destinations and trace a first set of respective routes taken by the respective route tracing test data packets, wherein the first respective last common node is a node furthest from the selected one of the first network device and the second network device that is common between each of the first set of routes; and
 wherein the first testing module further comprises at least two first sets of test transmission variable values, wherein the first set of test data traffic comprises a respective first throughput testing data packet corresponding to each of the at least two first sets of test transmission variable values, wherein the first testing module is further operable to transmit each respective first throughput testing test data packet to the first respective last common node and measure a corresponding transmission capacity when the selected one of the first network device and the second network device is configured with each of the at least two first sets of test transmission variable values, wherein the first throughput algorithm is further operable to analyze each of the at least two first sets of test transmission variable values and the corresponding transmission capacity and determine the first set of transmission variable values associated with the first maximum transmission capacity.

35. The system of claim 34, further comprising a second testing module operable to transmit a second set of test data traffic from the non-selected one of the first network device and the second network device, the second testing module having a second throughput algorithm operable to determine a second set of transmission variable values for the non-selected one of the first network device and the second network device, where the second set of transmission variable values are associated with a second maximum transmission capacity based on the transmitted second set of test data traffic from the non-selected one of the first network device and the second network device and a second respective last common node from among a second plurality of routes, through the network, traversed by a second set of at least two test data packets sent from the non-selected one of the first network device and the second network device;

wherein the second testing module further comprises a second route determination module comprising a second set of at least two route tracing test destinations located within the network, wherein the second route determination module is operable to send route tracing test data packets from the selected one of the first network device and the second network device to the second set of at least two route tracing test destinations and trace a second set of respective routes taken by the respective route tracing test data packets, wherein the second respective last common node is a node furthest from the selected one of the first network device and the second network device that is common between each of the second set of routes; and wherein the second testing module further comprises at least two second sets of test transmission variable values, wherein the second set of test data traffic comprises a respective second throughput data packet corresponding to each of the at least two second sets of test transmission variable values, wherein the second testing module is further operable to transmit each respective second throughput testing test data packet to the second respective last common node and measure a corresponding transmission capacity when the selected one of the first network device and the second network device is configured with each of the at least two second sets of test transmission variable values, wherein the second throughput algorithm is further operable to analyze each of the at least two second sets of test transmission variable values and the corresponding transmission capacity and determine the second set of transmission variable values associated with the second maximum transmission capacity.

36. The system of claim 35, wherein each of the at least two first sets of test transmission variable values and the at least two second sets of test transmission variable values comprises at least one of physical transmission variable values and logical transmission variable values, and wherein a first one of the logical transmission variable values is derived from one of the physical transmission variable values, and wherein a second one of the logical transmission variable values is independently determined.

37. The system of claim 35, wherein each of the first set of data traffic and the second set of data traffic comprises private communications-type data traffic.

38. The system of claim 35, wherein each of the first set of data traffic and the second set of data traffic comprises client/server-type data traffic.

39. The system of claim 35, wherein each of the at least two first sets of test transmission variable values and the at least two second sets of test transmission variable values comprises at least one of physical transmission variable values and logical transmission variable values.

40. A method of optimizing data transmissions between a first network device and a second network device, comprising:

sending, for a selected on of the first network device and the second network device, first test data to a first set of at least two test sites located within a communications network;

tracing a route taken by the first test data to each of the first set of at least two test sites;

comparing the traced routes taken by the first test data to determine a first respective last common node;

identifying a first optimized set of transmission variable values, for the selected one of the first network device and the second network device, associated with a first maximum transmission capacity based on a first set of transmitted data traffic from the selected one of the first network device and the second network device to the first respective last common node, wherein identifying the first optimized set of transmission variable values further comprises:

generating a plurality of sets of first test transmission variable values;

configuring the selected one of the first network device and the second network device with each of the plurality of sets of first test transmission variable values;

transmitting at least of first test data packet to the first respective last common node while the selected one of the first network device and the second network device is configured with each respective one of the plurality of sets of first test transmission variable values; and measuring a throughput to the first respective last common node of each transmission to determine the respective set of first test transmission variable values associated with the first maximum transmission capacity; and configuring the selected one of the first network device and the second network device with the first optimized set of transmission variable values.

41. The method of claim 40, further comprising:

sending, for the non-selected one of the first network device and the second network device, second test data to a second set of at least two test sites located within the communications network;

tracing the route taken by the second test data to each of the second set of at least two test sites;

comparing the traced routes taken by the second test data to determine a second respective last common node;

identifying a second optimized set of transmission variable values, for the non-selected one of the first network device and the second network device, associated with a second maximum transmission capacity based on a second set of transmitted data traffic from the non-selected one of the first network device and the second network device to the second respective last common node, wherein identifying the second optimized set of transmission variable values further comprises:

generating a plurality of sets of second test transmission variable values;

configuring the non-selected one of the first network device and the second network device with each of the plurality of sets of second test transmission variable values;

transmitting at least one second test data packet to the second respective last common node while the non-selected one of the first network device and the second network device is configured with each respective one of the plurality of sets of second test transmission variable values; and measuring a throughput to the second respective last common node of each transmission to determine the respective set of second test transmission variable values associated with the second maximum transmission capacity; and configuring the non-selected one of the first network device and the second network device with the second optimized set of transmission variable values.

42. The method of claim 41, for at least one of the first network device and the second network device, further comprising:

generating a plurality of sets of physical transmission variable values;

measuring a throughput associated with each of the plurality of sets of physical transmission variable values; and selecting the set of physical transmission variable values associated with a maximum throughput for inclusion in a corresponding one of the first optimized set of transmission variable values and the second optimized set of transmission variable values.

43. The method of claim 42, for at least one of the first network device and the second network device, further comprising:

deriving at least a portion of a set of logical transmission variable values from the selected set of physical transmission variable values;

generating a plurality of sets of logical transmission variable values, wherein the plurality of sets of logical transmission variable values includes the set of logical transmission variable values comprising the derived portion;

measuring a throughput associated with each of the plurality of sets of logical transmission variable values; and selecting the set of logical transmission variable values associated with a maximum throughput for inclusion in a corresponding one of the first optimized set of transmission variable values and the second optimized set of transmission variable values.

44. A system on a computer for maximizing transmission capacity between a first network device and a second network device connected through a plurality of nodes of a communications network, comprising:

an identification module having an optimization endpoint associated with the communications network, wherein the optimization endpoint is located between the first network device and the second network device, wherein the optimization endpoint corresponds to a last common node along transmission routes into the communications network traversed by at least two data packets sent from the first network device, wherein the identification module further comprises at least two route tracing test destinations located within the communications network, wherein the identification module is operable to send a route tracing test data packet from the first network device to the at least two route tracing test destinations and trace a respective route taken by each respective route tracing test data packet; wherein the last common node is the furthest node from the first network device that is common between each route;

a testing module having a data testing application operable to send representative test data from the first network device to the optimization endpoint and to measure a test data transmission capacity for each configuration of a plurality of sets of test transmission variable values on the first network device; and an optimization module having an optimization algorithm operable to analyze each of the plurality of sets of test transmission variable values and each corresponding test data transmission capacity and to determine an optimized set of transmission variable values for the first network device corresponding to the one of the plurality of sets of test transmission variable values having a maximum one of the respective test data transmission capacities.

45. The system of claim 44, wherein the optimization endpoint comprises the last common node.

46. The system of claim 44, wherein the optimized set of transmission variable values are associated with transmission variables optimized for a public communications type of data, and wherein the optimized set of transmission variable values are further optimized for a variable type comprising at least one of a physical transmission variable and a logical transmission variable.

47. The system of claim 46, wherein the optimization algorithm is further operable to iteratively adjust at least two values of the respective one of the plurality of sets of test transmission variable values to determine an optimized set of physical transmission variable values, and wherein the optimization algorithm is further operable to derive at least a portion of an optimized set of logical transmission variable values from the optimized set of physical transmission variable values.

48. The system of clam 44, wherein a connection between the first network device and the second network device comprises a point-to-point virtual private network.

49. The system of claim 48, wherein the optimized set of transmission variable values are associated with transmission variables optimized for a private communications type of data, and wherein the optimized set of transmission variable values are further optimized for a variable type comprising at least one of a physical transmission variable and a logical transmission variable.

50. The system of claim 49, wherein the optimization algorithm is further operable to iteratively adjust at least two values of the respective one of the plurality of sets of test transmission variable values to determine an optimized set of physical transmission variable values, and wherein the optimization algorithm is further operable to derive at least a portion of an optimized set of logical transmission variable values from the optimized set of physical transmission variable values.

51. A method of maximizing transmission capacity between a first network device and a second network device connected through a plurality of nodes of a communications network, comprising:

identifying an optimization endpoint associated with the communications network, wherein the optimization endpoint is located between the first network device and the second network device, wherein the optimization endpoint corresponds to a last common node along transmission routes into the communications network traversed by at least two data packets sent from the first network device, wherein identifying further comprises:

sending a route tracing test data packet from the first network device to at least two route tracing test destinations within the communications network; and tracing a respective route taken by each respective route tracing test data packet, wherein the last common node is a node furthest from the first network device that is common between each route;

sending representative test data from the first network device to the optimization endpoint and measuring a test data transmission capacity for each configuration of a plurality of sets of test transmission variable values on the first network device; and analyzing each of the plurality of sets of test transmission variable values and each corresponding test data transmission capacity and determining an optimized set of transmission variable values for the first network device corresponding to the one of the plurality of sets of test transmission variable values having a maximum one of the respective test data transmission capacities.

52. The method of claim 51, wherein the optimization endpoint comprises the last common node.

53. The method of claim 52, wherein determining the optimized set of transmission variable values further comprises optimizing transmission variables associated with a public communications type of data, and further optimizing for a variable type comprising at least one of a physical transmission variable and a logical transmission variable.

54. The method of claim 53, wherein determining the optimized set of transmission variable values further comprises iteratively adjusting at least two values of respective one of the plurality of sets of test transmission variable values to determine an optimized set of physical transmission variable values, and deriving at least a portion of an optimized set of logical transmission variable values from the optimized set of physical transmission variable values.

55. The method of claim 51, further comprising connecting the first network device and the second network device in a point-to-point virtual private network.

56. The method of claim 55, wherein determining the optimized set of transmission variable values further comprises optimizing for a private communications type of data, and further optimizing for a variable type comprising at least one of a physical transmission variable and a logical transmission variable.

57. The method of claim 56, wherein determining the optimized set of transmission variable values further comprises iteratively adjusting at least two values of the respective one of the plurality of sets of test transmission variable values to determine an optimized set of physical transmission variable values, and deriving at least a portion of an optimized set of logical transmission variable values from the optimized set of physical transmission variable values.

58. The method of claim 51, wherein sending representative test data further comprises, for each of the plurality of sets of test transmission variable values, transmitting the representative test data a predetermined number of times thereby resulting in a plurality of test data transmission capacities for each of the plurality of sets of test transmission variable values, wherein the test data transmission capacity corresponding to a respective one of the plurality of sets of test transmission variable values is based on the corresponding plurality of test data transmission capacities.

59. An apparatus in a computer for maximizing transmission capacity between a first network device and a second network device connected through a plurality of nodes of a communications network, comprising:

means for identifying an optimization endpoint associated with the communications network, wherein the optimization endpoint is located between the first network device and the second network device, wherein the optimization endpoint corresponds to a last common node along transmission routes into the communications network traversed by at least two data packets sent from the first network device, wherein the means for identifying further comprises:

means for sending a route tracing test data packet from the first network device to at least two route tracing test destinations within the communications network; and means for tracing a respective route taken by each respective route tracing test data packet, wherein the last common node is the furthest node from the first network device that is common between each route;

means for sending representative test data from the first network device to the optimization endpoint and measuring a test data transmission capacity for each configuration of a plurality of sets of test transmission variable values on the first network device; and means for analyzing each of the plurality of sets of test transmission variable values and each corresponding test data transmission capacity and means for determining an optimized set of transmission variable values for the first network device corresponding to the one of the plurality of sets of test transmission variable values having a maximum one of the respective test data transmission capacities.

60. A memory comprising instructions stored thereon, comprising:

a first set of instructions for identifying an optimization endpoint associated with a communications network, wherein the optimization endpoint is located between a first network device and the a second network device, wherein the optimization endpoint corresponds to a last common node along transmission routes into the communications network traversed by at least two data packets sent from the first network device, wherein identifying further comprises:

sending a route tracing test data packet from the first network device to at least two route tracing test destinations within the communications network; and tracing a respective route taken by each respective route tracing test data packet, wherein the last common node is a node furthest from the first network device that is common between each route;

a second set of instructions for sending representative test data from the first network device to the optimization endpoint and measuring a test data transmission capacity for each configuration of a plurality of sets of test transmission variable values on the first network device; and a third set of instructions for analyzing each of the plurality of sets of test transmission variable values and each corresponding test data transmission capacity and determining an optimized set of transmission variable values for the first network device corresponding to the one of the plurality of sets of test transmission variable values having a maximum one of the respective test data transmission capacities.

61. An apparatus in a computer for optimizing network communications, comprising:

a route discovery module operable to identify a last common node shared by at least two routes respectively traversed by at least two route tracing test data packets sent from a first network device into a communication network having a plurality of nodes, wherein at least two of the at least two route tracing test data packets are respectively sent to different ones of at least two route tracing test destinations within the communication network, wherein each of the at least two routes respectively comprises a sequence of some of the plurality of nodes, wherein the last common node comprises a last persistent hop furthest from the first network device shared by the at least two routes; and a throughput optimization module operable to configure the first network device with an optimized set of transmission variable values based on a plurality of sets of test transmission variable values, wherein each of the plurality of sets of test transmission variable values corresponds to one of a plurality of test throughput values of respective throughput testing test data packets sent from the first network device to an optimization endpoint when the first network device is configured with the respective set of test transmission variable values, wherein the optimization endpoint is based on the last common node, wherein the optimized set of transmission variable values is based on a highest one of the plurality of test throughput values.

62. A method for optimizing network communications, comprising:

identifying a last common node shared by at least two routes respectively traversed by at least two route tracing test data packets sent from a first network device into a communication network having a plurality of nodes, wherein at least two of the at least two route tracing test data packets are respectively sent to different ones of at least two route tracing test destinations within the communication network, wherein each of the at least two routes respectively comprises a sequence of some of the plurality of nodes, wherein the last common node comprises a last persistent hop furthest from the first network device shared by the at least two routes; and configuring the first network device with an optimized set of transmission variable values based on a plurality of sets of test transmission variable values, wherein each of the plurality of sets of test transmission variable values corresponds to one of a plurality of test throughput values of respective throughput testing test data packets sent from the first network device to an optimization endpoint when the first network device is configured with the respective set of test transmission variable values, wherein the optimization endpoint is based on the last common node, wherein the optimized set of transmission variable values is based on a highest one of the plurality of test throughput values.

63. A memory comprising instructions stored thereon, comprising:

a first set of instructions for identifying a last common node shared by at least two routes respectively traversed by at least two route tracing test data packets sent from a first network device into a communication network having a plurality of nodes, wherein at least two of the at least two route tracing test data packets are respectively sent to different ones of at least two route tracing test destinations within the communication network, wherein each of the at least two routes respectively comprises a sequence of some of the plurality of nodes wherein the last common node comprises a last persistent hop furthest from the first network device shared by the at least two routes; and a second set of instructions for configuring the first network device with an optimized set of transmission variable values based on a plurality of sets of test transmission variable values, wherein each of the plurality of sets of test transmission variable values corresponds to one of a plurality of test throughput values of respective throughput testing test data packets sent from the first network device to an optimization endpoint when the first network device is configured with the respective set of test transmission variable values, wherein the optimization endpoint is based on the last common node, wherein the optimized set of transmission variable values is based on a highest one of the plurality of test throughput values.

64. An apparatus in a computer for optimizing network communications, comprising:

means for identifying a last common node shared by at least two routes respectively traversed by at least two route tracing test data packets sent from a first network device into a communication network having a plurality of nodes, wherein at least two of the at least two route tracing test data packets are respectively sent to different ones of at least two route tracing test destinations within the communication network, wherein each of the at least two routes respectively comprises a sequence of some of the plurality of nodes, wherein the last common node comprises a last persistent hop furthest from the first network device shared by the at least two routes; and means for configuring the first network device with an optimized set of transmission variable values based on a plurality of sets of test transmission variable values, wherein each of the plurality of sets of test transmission variable values corresponds to one of a plurality of test throughput values of respective throughput testing test data packets sent from the first network device to an optimization endpoint when the first network device is configured with the respective set of test transmission variable values, wherein the optimization endpoint is based on the last common node, wherein the optimized set of transmission variable values is based on a highest one of the plurality of test throughput values.

* * * * *